（12） United States Patent
Osada

(10) Patent No.: US 7,174,559 B2
(45) Date of Patent: Feb. 6, 2007

(54) DISK DRIVE WITH OPTICAL PICKUP GUIDING AND DISK TABLE RESTRICTING ELEMENT

(75) Inventor: Yasuo Osada, Saitama (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 10/875,324

(22) Filed: Jun. 25, 2004

(65) Prior Publication Data

US 2005/0028181 A1 Feb. 3, 2005

(30) Foreign Application Priority Data

Jul. 16, 2003 (JP) ............... 2003-275318

(51) Int. Cl.
*G11B 17/028* (2006.01)
*G11B 21/02* (2006.01)

(52) U.S. Cl. ..................... 720/695; 720/676

(58) Field of Classification Search ............... 720/659, 720/663, 666, 676–679, 689, 696–698, 700, 720/715
See application file for complete search history.

(56) References Cited

U.S. PATENT DOCUMENTS

| | | | | |
|---|---|---|---|---|
| 4,570,254 A | * | 2/1986 | Agostini | 720/696 |
| 4,783,717 A | * | 11/1988 | Zeeman | 720/715 |
| 6,680,896 B2 | * | 1/2004 | Shiwa | 720/695 |
| 2003/0031111 A1 | * | 2/2003 | Osada et al. | 369/219 |

FOREIGN PATENT DOCUMENTS

JP 03268278 A * 11/1991

* cited by examiner

*Primary Examiner*—Andrea Wellington
*Assistant Examiner*—Nathan Danielsen
(74) *Attorney, Agent, or Firm*—Oblon, Spivak, McClelland, Maier & Neustadt, P.C.

(57) ABSTRACT

Disclosed herein is a disk drive including a base, a spindle motor mounted on the base, a disk table fixed to a motor shaft of the spindle motor and adapted to be rotated about the axis of the motor shaft by the spindle motor, an optical pickup supported movably in the radial direction of a disk-shaped recording medium mounted on the disk table, an installation plate detachably mounted on the base, a guided portion provided on the optical pickup and adapted to be guided during movement of the optical pickup in the radial direction of the disk-shaped recording medium, and a restricted groove formed on the outer circumferential surface of the disk table so as to extend in the circumferential direction of the disk table. The installation plate is integrally formed with a restricting portion inserted in the restricted groove of the disk table for restricting movement of the disk table in the axial direction of the motor shaft, and a guiding portion engaged with the guided portion of the optical pickup for guiding the optical pickup in the radial direction of the disk-shaped recording medium. Accordingly, the structure of the disk drive can be simplified and the number of parts can be reduced.

4 Claims, 36 Drawing Sheets

F I G. 2 1
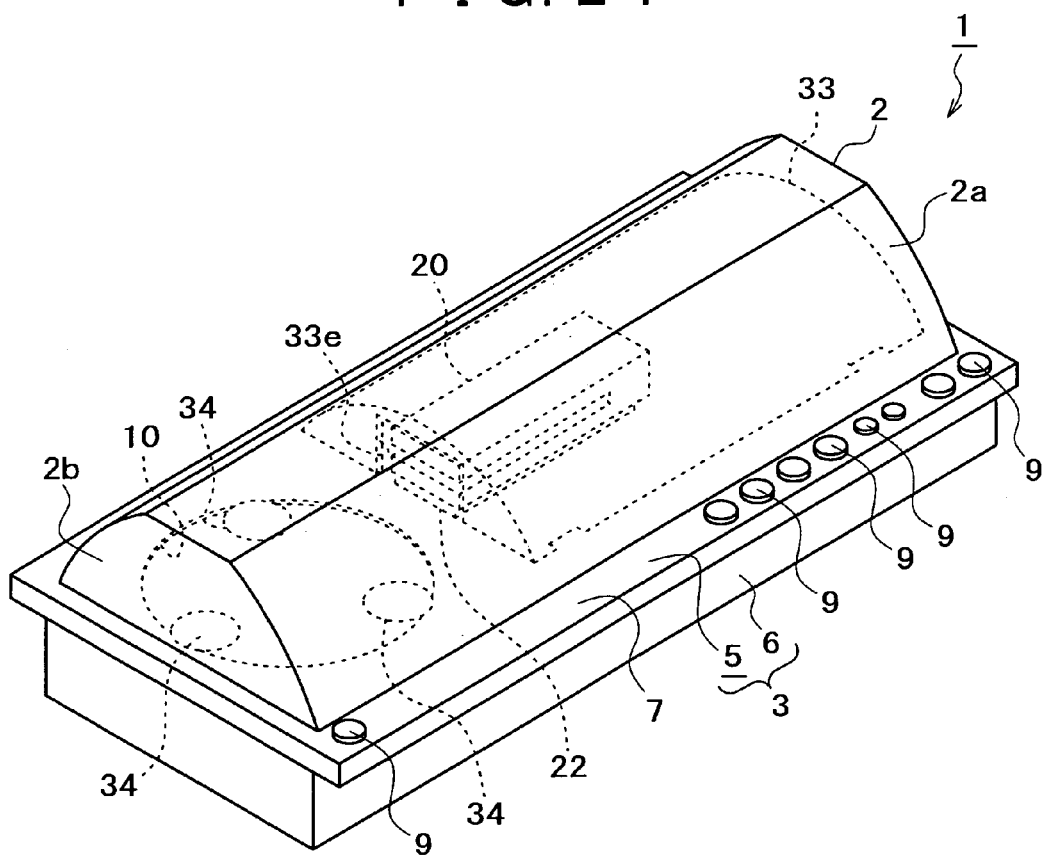

F I G. 2 4
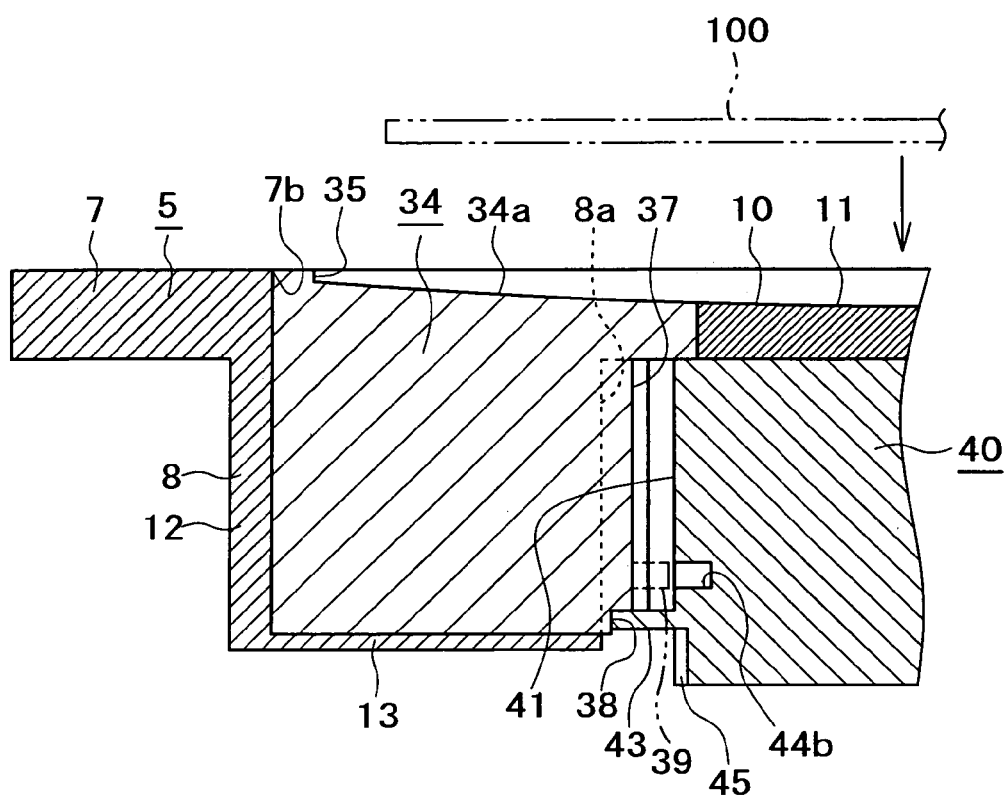

F I G. 3 1
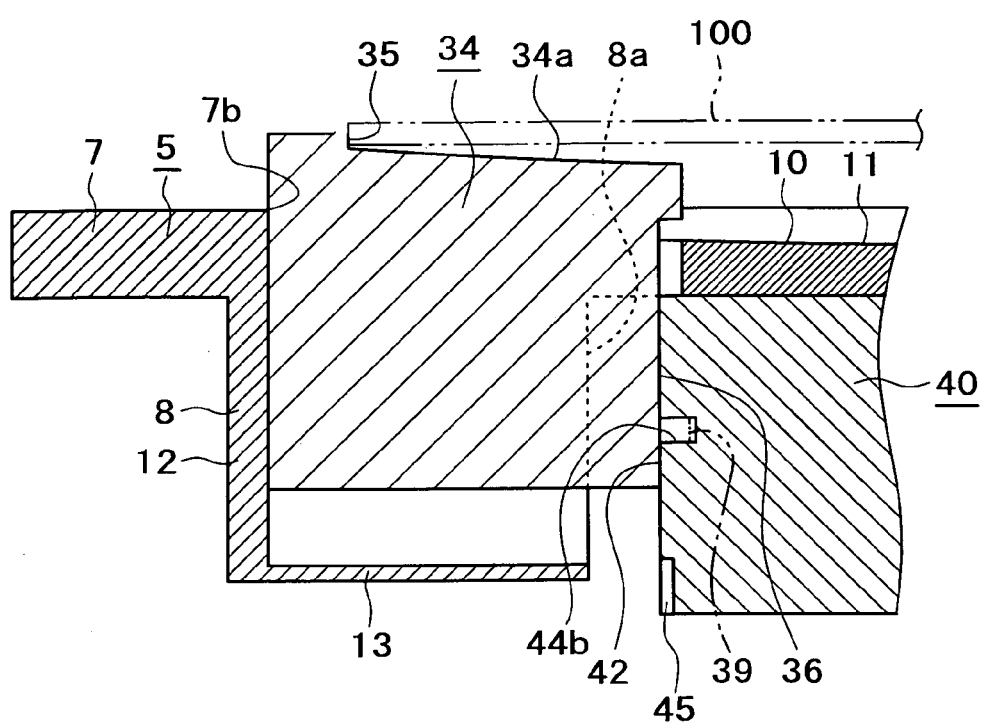

DISK DRIVE WITH OPTICAL PICKUP GUIDING AND DISK TABLE RESTRICTING ELEMENT

BACKGROUND OF THE INVENTION

The present invention relates to a disk drive, and more particularly to a disk drive that can be simplified in structure and can be reduced in number of parts by making an installation plate, which is mounted on a base, be integrally formed with various functional portions.

A disk drive capable of recording or reproducing an information signal to/from a disk-shaped recording medium such as an optical disk and a magneto-optical disk is provided with an optical pickup. The optical pickup is adapted to be moved in the radial direction of the recording medium mounted on a disk table and to direct laser light onto the recording medium.

Such an optical pickup is provided as a part of a base unit, for example. The base unit has a housing composed of a boxlike base opening to one side and an installation plate for closing the opening of the base. Required components including the optical pickup and the disk table are installed in the housing.

A guide mechanism is required to move the optical pickup in the radial direction of the recording medium. For example, such a guide mechanism includes two parallel guide shafts (see Japanese Patent Laid-open No. Hei 9-198686, for example). The two guide shafts are slidably inserted through two guided portions (bearing portions) provided on a moving base of the optical pickup, whereby the optical pickup is moved in the radial direction of the recording medium as being guided by the two guide shafts.

On the other hand, the disk table for mounting the recording medium thereon is fixed to a motor shaft of a spindle motor and is rotated about the axis of the motor shaft by the spindle motor. The spindle motor includes a rotor and a stator. The rotor is rotated about the axis of the motor shaft relative to the stator.

In general, a disk drive includes a disconnection preventing mechanism for preventing disconnection of the rotor of a spindle motor from the stator due to vibrations generated during transportation or shock upon falling or the like.

FIG. 38 shows such a disconnection preventing mechanism in a conventional disk drive. As shown in FIG. 38, a motor shaft c is fixed to a rotor b of a spindle motor a, and a disk table d is fixed to the motor shaft c. A stator board g of a stator f is provided on a base e, and a disconnection prevention member h is mounted on the stator board g by a mounting screw i.

In this conventional disk drive, however, two dedicated guide shafts are required as a guide mechanism for guiding an optical pickup. Thus, the number of parts is large, and the mechanism is complicated, causing an increase in manufacturing cost.

Further, in assembling the base unit, it is necessary to mount the installation plate on the base e after mounting the two guide shafts and the disconnection prevention member h. Conversely, in performing the maintenance of the base unit, the installation plate is first removed from the base e, and the guide shafts and the disconnection prevention member h are next removed. Thus, the number of man-hours required is large, causing a troublesome work.

If the disconnection prevention member h is formed from a resin material, the manufacturing cost can be reduced. However, in the case of a large vibration or shock, there is a possibility that the disconnection prevention member h may break to impair the function of the disconnection preventing mechanism.

SUMMARY OF THE INVENTION

It is accordingly an object of the present invention to provide a disk drive that can be simplified in structure and can be reduced in number of parts.

In accordance with the present invention, there is provided a disk drive including a base, a spindle motor mounted on the base, a disk table fixed to a motor shaft of the spindle motor and adapted to be rotated about the axis of the motor shaft by the spindle motor, an optical pickup supported movably in the radial direction of a disk-shaped recording medium mounted on the disk table, an installation plate detachably mounted on the base, a guided portion provided on the optical pickup and adapted to be guided during movement of the optical pickup in the radial direction of the disk-shaped recording medium, and a restricted groove formed on the outer circumferential surface of the disk table so as to extend in the circumferential direction of the disk table. The installation plate is integrally formed with a restricting portion inserted in the restricted groove of the disk table for restricting movement of the disk table in the axial direction of the motor shaft, and a guiding portion engaged with the guided portion of the optical pickup for guiding the optical pickup in the radial direction of the disk-shaped recording medium.

With this structure, the installation plate functions both as a disconnection preventing mechanism for the disk table and the spindle motor and as a guiding mechanism for the optical pickup.

Accordingly, it is unnecessary to provide any dedicated member for preventing disconnection of the disk table and any dedicated member for guiding the optical pickup, so that the structure of the disk drive can be simplified and the number of parts can be reduced.

Furthermore, any steps for mounting the above dedicated members to the base are not required. As a result, the number of man-hours for assembly of the components of the disk drive can be reduced to thereby improve the workability in assembling and the maintainability.

Preferably, the restricting portion includes an opening edge of a recess opening in a direction perpendicular to a direction along the thickness of the installation plate, at least a part of the opening edge being formed as an arcuate portion. Accordingly, the installation plate can be moved in the opening direction of the recess in mounting or demounting the installation plate with respect to the base. Thus, the installation plate can be easily mounted or demounted with respect to the base.

Preferably, the arcuate portion has a central angle of 180° or more. Accordingly, a force of restricting the movement of the disk table in its disconnecting direction can be dispersed to thereby improve the restricting force by the restricting portion.

Preferably, the installation plate is formed of a magnetic material, and the guided portion is provided with a magnet for generating an attractive force in the axial direction of the motor shaft to attract the guiding portion. Accordingly, the magnet is relatively attracted to the guided portion of the installation plate, so that the optical pickup can be moved in the radial direction of the disk-shaped recording medium in the stable condition where no oscillation in the focusing direction occurs. As a result, it is possible to prevent the occurrence of recording errors and reproducing errors of an information signal.

BRIEF DESCRIPTION OF THE DRAWINGS

These and other objects of the invention will be seen by reference to the description, taken in connection with the accompanying drawing, in which:

FIG. 21 is a perspective view of the disk drive in its initial condition;

FIG. 24 is an enlarged sectional view corresponding to FIG. 23;

FIG. 31 is an enlarged sectional view showing a condition where the slide pins are inserted into inclined portions of the cam grooves, and the recording medium is lifted by the disk centering members;

DETAILED DESCRIPTION OF THE PREFERRED EMBODIMENTS

Figure 1:
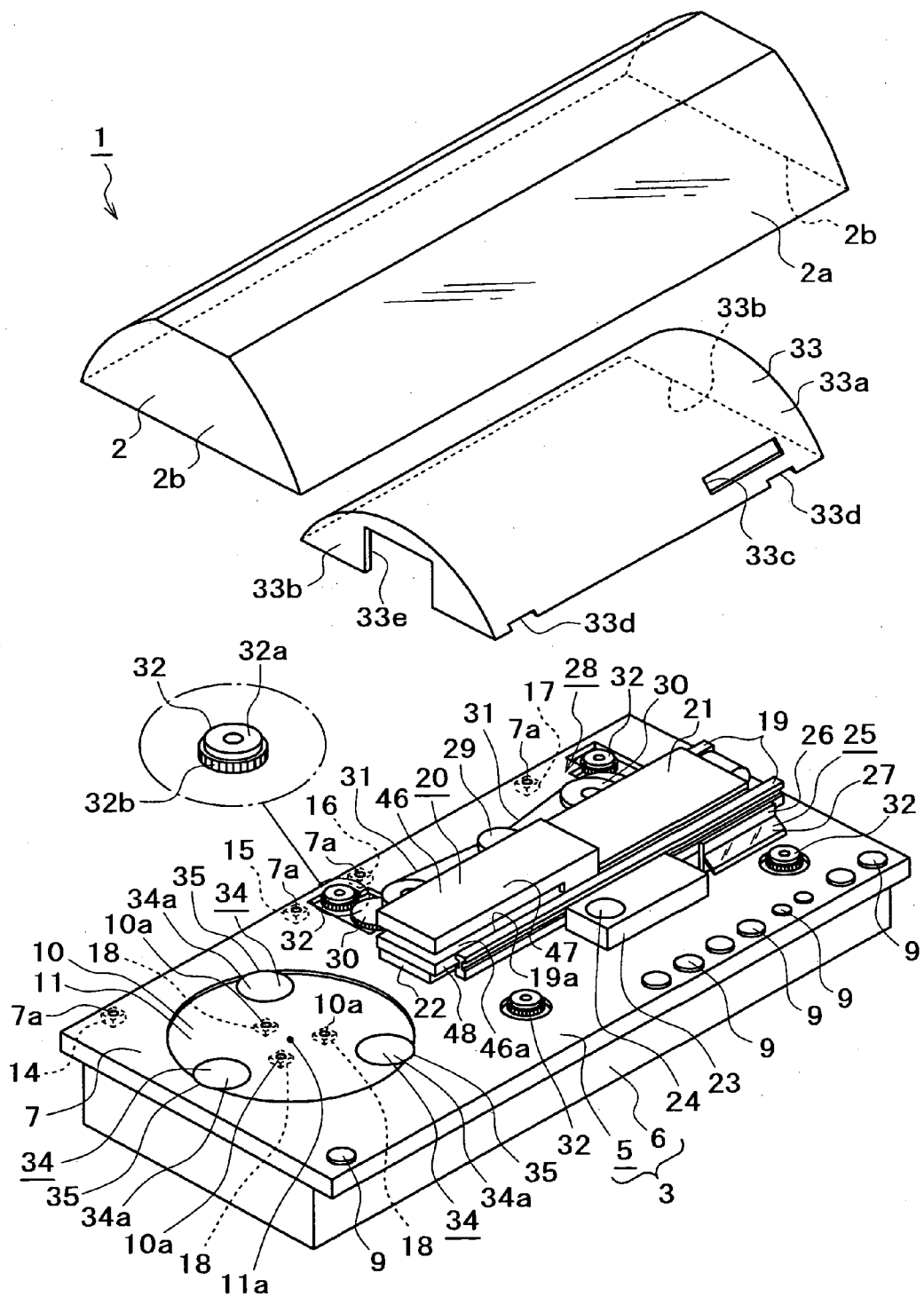
FIG. 1 is a perspective view of a disk drive according to a preferred embodiment of the present invention in the condition where a cover and an inner cover are separated from a base panel.

Preferred embodiments of the present invention will now be described with reference to the attached drawings.

Reference numeral 1 generally denotes a disk drive according to a preferred embodiment of the present invention. The disk drive 1 is a device for recording or reproducing an information signal to/from a disk-shaped recording medium (which will be hereinafter referred to simply as "disk") 100. The disk drive 1 is composed of a cover 2, a base 3, and various required members and mechanisms provided on the base 3 (see FIGS. 1 and 2).

The cover 2 is formed of a transparent material such as glass or resin. The cover 2 has a substantially semicylindrical shape opening to the lower side and extending in one direction. The cover 2 is composed of a roof portion 2a having a substantially arcuate cross-sectional shape and a pair of end portions 2b formed integrally with the roof portion 2a at its longitudinally opposite ends.

In the following description, the longitudinal direction of the cover 2 will be defined as a direction of pointing the front and rear sides of the cover 2, and the directions perpendicular to the longitudinal direction of the cover 2 will be defined as a direction of pointing the upper and lower sides of the cover 2 (i.e., vertical direction) and a direction of pointing the right and left sides of the cover 2 (i.e., lateral direction).

Figure 3:
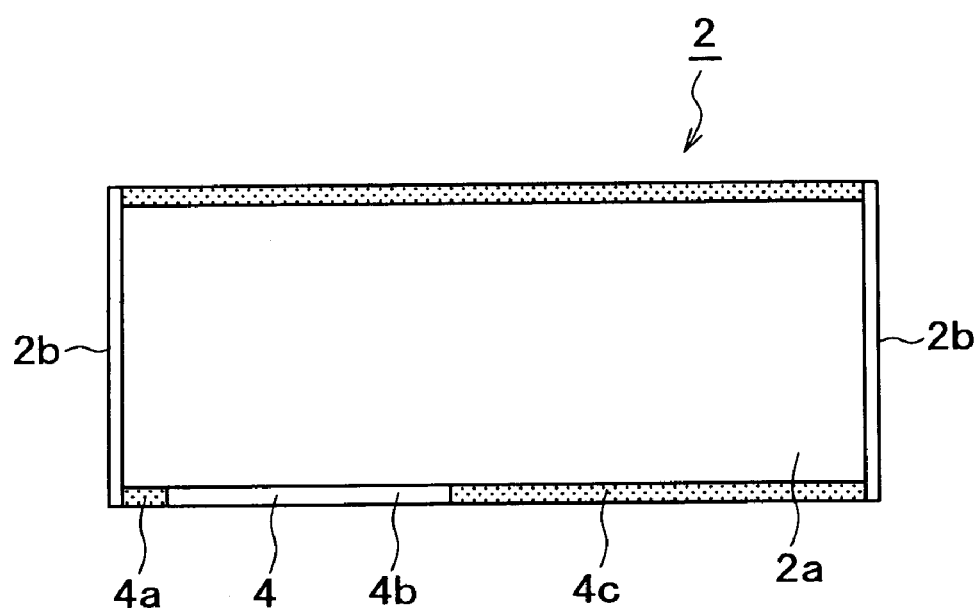
FIG. 3 is a schematic bottom plan view of the cover.

One of the two lower end surfaces of the cover 2 extending in its longitudinal direction is formed as a sensed portion 4 (see FIG. 3). The sensed portion 4 is composed of a first nonreflective portion 4a, a reflective portion 4b, and a second nonreflective portion 4c arranged in this order from the front side of the cover 2. The first nonreflective portion 4a is formed at a front end portion of the sensed portion 4. The reflective portion 4b is formed continuously from the first nonreflective portion 4a to a substantially longitudinally central portion of the sensed portion 4. The second nonreflective portion 4c is formed opposite to the first nonreflective portion 4a with respect to the reflective portion 4b to the rear end of the cover 2. The reflective portion 4b is formed by aluminum evaporation or the like to the lower end surface of the cover 2. The nonreflective portions 4a and 4c are formed by forming a light absorbing film on the lower end surface of the cover 2. Alternatively, the nonreflective portions 4a and 4c may be formed by forming a light transmitting film on the lower end surface of the cover 2.

Figure 2:
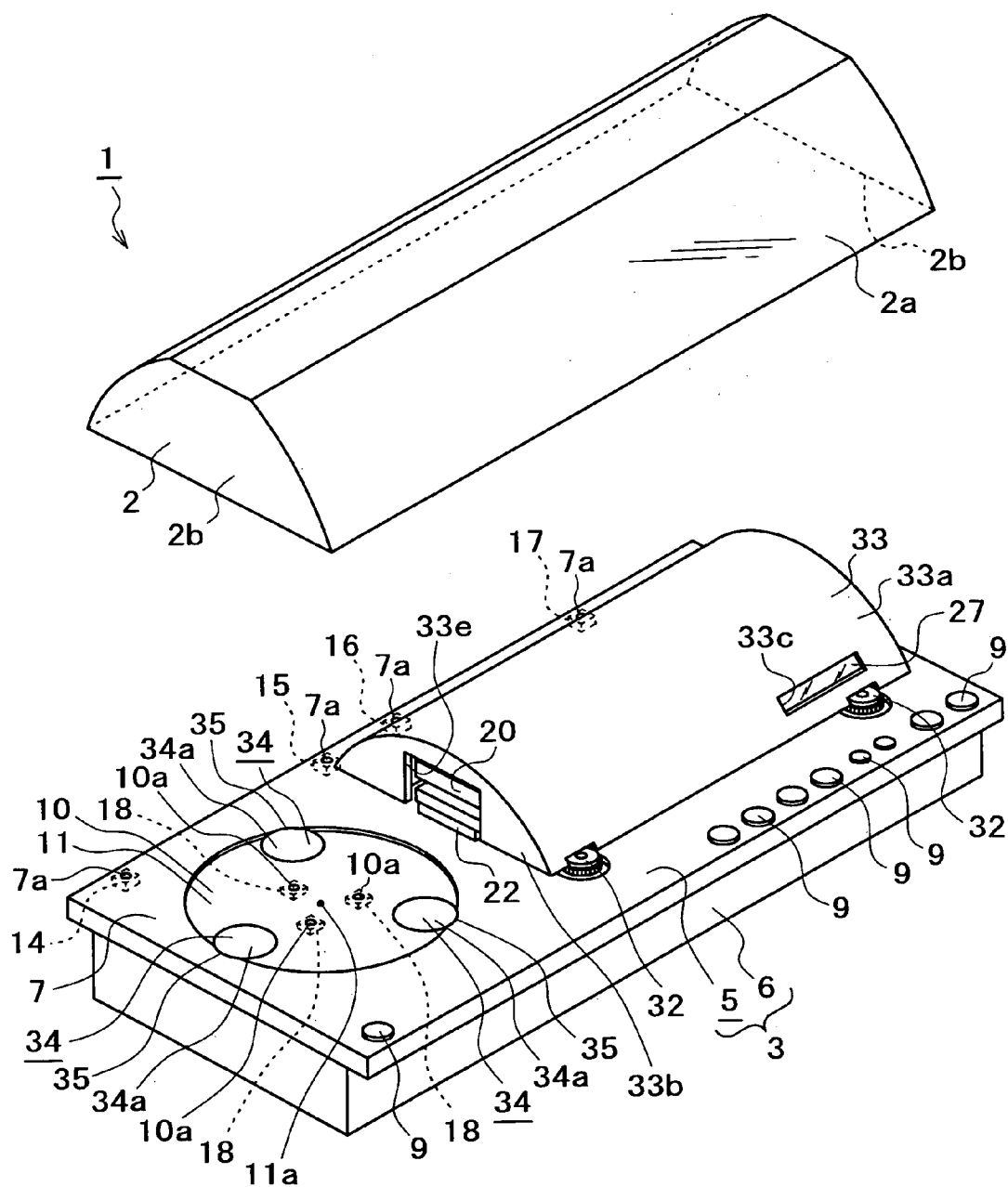
FIG. 2 is a perspective view of the disk drive in the condition where the cover is separated from the base panel.

As shown in FIGS. 1 and 2, the base 3 is composed of a base panel 5 and a bottom panel 6 connected to the lower side of the base panel 5. The bottom panel 6 is a box-shaped member elongated in the longitudinal direction and opening to the upper side.

Figure 4:
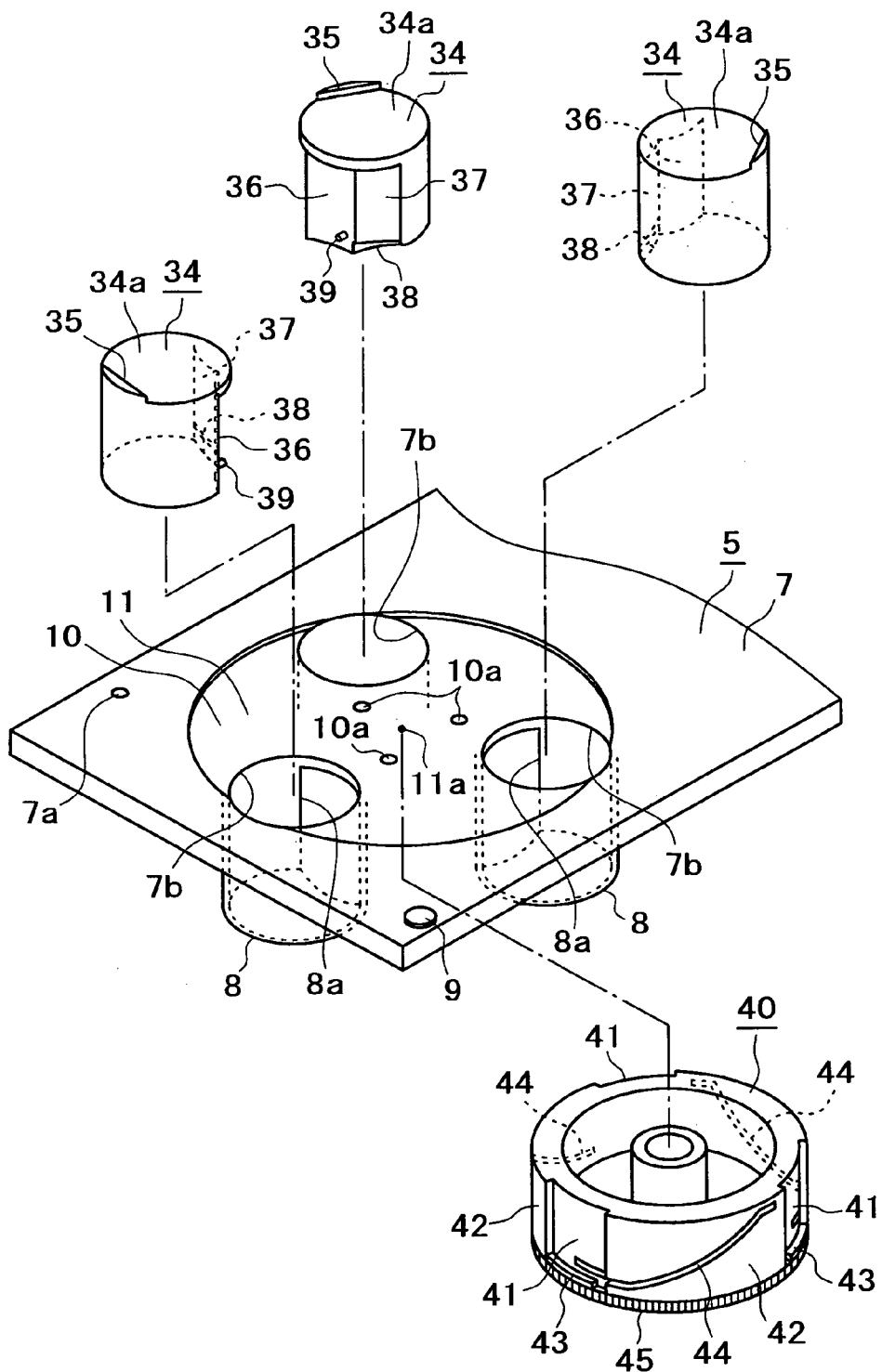
FIG. 4 is an exploded perspective view showing a recording medium mounting portion, rotary members, and a cam member.
Figure 5:
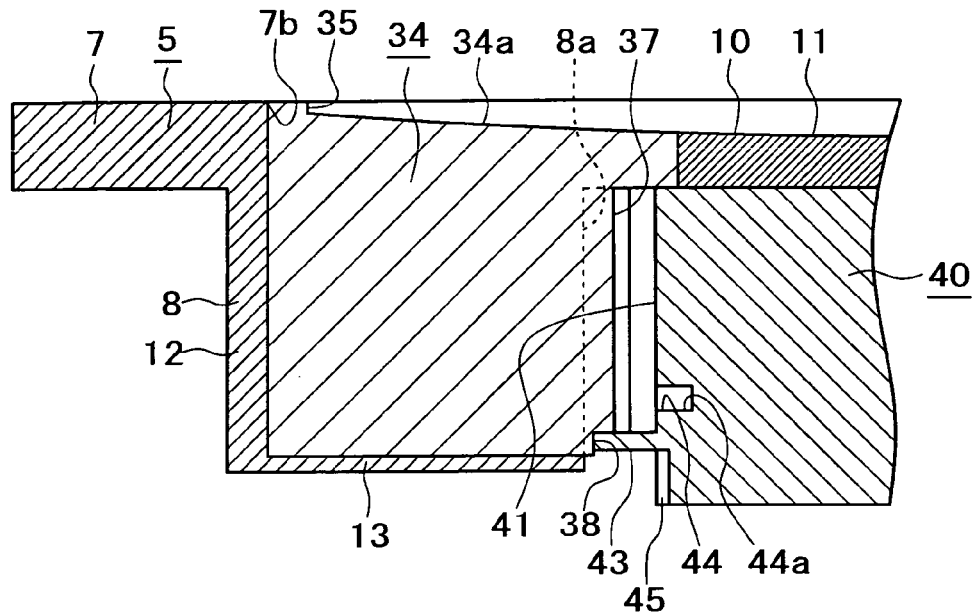
FIG. 5 is an enlarged sectional view showing the relation between each rotary member and the cam member.

As shown in FIG. 4, the base panel 5 is composed of a substantially platelike base portion 7 and three support cylinder portions 8 formed integrally with the base portion 7 so as to project downward from the base portion 7.

The base portion 7 is formed with four light transmitting holes 7a along the left side edge of the base portion 7. These light transmitting holes 7a are spaced apart from each other in the longitudinal direction (see FIGS. 1 and 2).

A plurality of operation buttons 9 are arranged along the right side edge of the base portion 7 so as to be spaced apart from each other in the longitudinal direction. The operation buttons 9 include a power button for powering on or off the disk drive 1, an open button for opening the cover 2, a close button for closing the cover 2, a play button for reproducing an information signal recorded on the disk 100, a pause button for temporarily stopping a reproducing condition, a stop button for stopping a reproducing operation, and a volume button for changing a sound level.

A recording medium mounting portion 10 is provided at a front portion of the base portion 7 in its longitudinal direction (see FIGS. 1, 2, and 4).

The recording medium mounting portion 10 is formed like a shallow dish having a circular shape as viewed in plan. The bottom surface of the recording medium mounting portion 10 is formed as a disk mounting surface 11. The disk mounting surface 11 is a gently concave surface, e.g., a spherical surface. The center point of the disk mounting surface 11 at the lowest level is formed as a reference point 11a. The recording medium mounting portion 10 is formed with three sensor holes 10a passing vertically.

The support cylinder portions 8 of the base panel 5 project downward from an outer circumferential portion of the disk mounting surface 11 and open to the upper side (see FIG. 4). Accordingly, the base portion 7 is formed with three openings 7b. These openings 7b are formed astride the disk mounting surface 11 and its just outside portion. The support cylinder portions 8 are equally spaced apart from each other in the circumferential direction, and the radial distances from the axes of the support cylinder portions 8 to the reference point 11a are equal to each other.

Each support cylinder portion 8 is composed of a vertically elongated arcuate portion 12 and a closing end portion 13 for closing a lower opening of the arcuate portion 12. The arcuate portion 12 and the closing end portion 13 are recessed at a position directed to the reference point 11a. This recessed portion is formed as a locating recess 8a.

First, second, third, and fourth sensors 14, 15, 16, and 17 are located in the base 3 under the four light transmitting holes 7a, respectively. These sensors 14 to 17 are reflective optical sensors, for example, and function as means for detecting the position of the sensed portion 4 of the cover 2. Each optical sensor has a light emitting portion for emitting detection light and a photodetecting portion for detecting the detection light.

Further, three sensors 18 are located in the base 3 just under the sensor holes 10a formed through the recording medium mounting portion 10, respectively. These sensors 18 function to detect whether or not the disk 100 is present over the disk mounting surface 11. When the disk 100 is placed over the disk mounting surface 11, detection light emitted from the sensors 18 and passed through the sensor holes 10a is reflected on the disk 100 to thereby detect the presence of the disk 100 over the disk mounting surface 11.

Two parallel guide members 19 are provided on the upper surface of the base portion 7 of the base 3 (see FIG. 1). The guide members 19 extend in the longitudinal direction of the base portion 7 at a rear portion thereof. The opposed surfaces of the guide members 19 are formed with guide grooves (not shown) extending in the longitudinal direction of the guide members 19.

A substantially front half portion of the space defined between the guide members 19 on the side of the recording medium mounting portion 10 is formed as a unit accommodating portion 19a for accommodating a base unit 20. In the remaining rear half portion of the space defined between the guide members 19 on the side opposite to the recording medium mounting portion 10 with respect to the unit accommodating portion 19a, a control board 21 for controlling the operation of the base unit 20 is located.

The base unit 20 and the control board 21 are mounted on a mounting base 22. The mounting base 22 extends in the longitudinal direction, and guided pins (not shown) project sideward from the opposite side surfaces of the mounting base 22. The guided pins of the mounting base 22 are slidably engaged with the guide grooves of the guide members 19, so that the mounting base 22 is movable in the longitudinal direction as being guided by the guide members 19. A rack portion (not shown) is formed on the right side surface of the mounting base 22.

A unit driving portion 23 is located on the right side of the right guide member 19 on the base panel 5. The unit driving portion 23 includes a driving motor 24 and a reduction gear train (not shown) for transmitting a drive force of the driving motor 24. A final gear of the reduction gear train is in mesh with the rack portion of the mounting base 22. Accordingly, when the driving motor 24 is operated, the drive force of the motor 24 is transmitted through the reduction gear train to the rack portion of the mounting base 22, so that the mounting base 22, the base unit 20, and the control board 21 are moved together in the frontward or rearward direction according to the rotational direction of the motor 24.

A display driving portion 25 is located on the rear side of the unit driving portion 23 on the base panel 5. The display driving portion 25 includes a control circuit board 26 and a display portion 27 for displaying operational conditions or the like.

A cover driving portion 28 is located on the left side of the left guide member 19 on the base panel 5. The cover driving portion 28 includes a moving motor 29 and two reduction gear trains 30 for transmitting a drive force of the moving motor 29. The reduction gear trains 30 are located on the front and rear sides of the moving motor 29.

Pulleys (not shown) are provided on the moving motor 29 and the reduction gear trains 30. The pulley on the moving motor 29 and the pulleys on the reduction gear trains 30 are connected by belts 31. Accordingly, when the moving motor 29 is operated, the drive force of the motor 29 is transmitted through the belts 31 to the reduction gear trains 30, so that the reduction gear trains 30 are synchronously rotated in the same direction according to the rotational direction of the motor 29.

Four gear units 32 are rotatably supported to the base panel 5 in such a manner that two of the gear units 32 are arranged along the left side edge of the base panel 5 and the remaining two gear units 32 are arranged along the right side edge of the base panel 5. Each gear unit 32 is composed of an upper roller 32a and a lower gear 32b. The roller 32a is formed of a material having a high coefficient of friction, such as a rubber material.

The gears 32b of the two gear units 32 arranged on the left side are in mesh with the final gears of the reduction gear trains 30, respectively.

In the condition where the cover 2 is mounted on the base panel 5, the rollers 32a of all the gear units 32 are in pressure contact with the inner surface of the roof portion 2a of the cover 2 at lower end portions on the right and left sides. Accordingly, when the drive force of the moving motor 29 is transmitted through the reduction gear trains 30 to the left gear units 32, the cover 2 is moved in the frontward or rearward direction according to the rotational direction of the moving motor 29.

An inner cover 33 is provided inside of the cover 2. The inner cover 33 is formed of an opaque material such as resin, and it extends in the longitudinal direction and opens to the lower side. The inner cover 33 is composed of a roof portion 33a having an arcuate cross-sectional shape and a pair of end portions 33b formed integrally with the roof portion 33a at its longitudinally opposite ends. An elongated through hole 33c is formed at a rear portion of the roof portion 33a, and four locating recesses 33d are formed on the lower end surfaces of the roof portion 33a in such a manner that two of the locating recesses 33d are arranged on the right side so as to be spaced apart from each other in the longitudinal direction and the remaining two locating recesses 33d are also similarly arranged on the left side. Further, the front end portion 33b is formed with a relatively large recess 33e opening to the lower side as an inlet/outlet hole for the base unit 20 and the mounting base 22.

The inner cover 33 is mounted on the base panel 5 so as to enclose the guide members 19, the base unit 20, the control board 21, the mounting base 22, the unit driving portion 23, the display driving portion 25, and the cover driving portion 28. In the condition where the inner cover 33 is mounted on the base panel 5, the display portion 27 of the display driving portion 25 is aligned to the through hole 33c, thereby making information displayed on the display portion 27 visible from the outside of the inner cover 33. In the condition where the inner cover 33 is mounted on the base panel 5, the locating recesses 33d are positioned so as to respectively correspond to the gear units 32, and a part of each gear unit 32 projects outside of the inner cover 33. The base unit 20 is movable frontward through the inlet/outlet hole 33e of the inner cover 33.

Three rotary members 34 are rotatably supported in the support cylinder portions 8 of the base panel 5, respectively (see FIG. 4). These rotary members 34 have a function of centering the disk 100 placed over the disk mounting surface 11 and another function of lifting the disk 100.

Each rotary member 34 is substantially cylindrical and has an upper surface 34a gently curved in concert with the disk mounting surface 11 of the base panel 5. A disk centering portion 35 projects upward from the upper surface 34a of each rotary member 34 along a part of the circumference of the upper surface 34a. The disk centering portion 35 is located so as to correspond to a portion of each opening 7b of the base portion 7 just outside of the disk mounting surface 11.

The cylindrical surface of each rotary member 34 is recessed except an upper end portion. The recessed portion of the cylindrical surface of each rotary member 34 is formed as a first Geneva surface 36 and a depressed surface 37 continuous to each other in the circumferential direction. The first Geneva surface 36 is a concave arcuate surface, and the depressed surface 37 is a concave surface having a predetermined shape. The depressed surface 37 is further recessed at its lower end portion to form a second Geneva surface 38.

A slide pin 39 projects from the first Geneva surface 36 of each rotary member 34 at a lower end portion thereof.

The rotary members 34 are inserted into the support cylinder portions 8 from the upper side and rotatably supported therein (see FIGS. 1 and 2).

In the condition where the rotary members 34 are supported in the support cylinder portions 8, and the disk centering portions 35 are positioned so as to correspond to the portions of the base panel 5 just outside of the disk mounting surface 11, the disk mounting surface 11 of the base panel 5 is continuous to the upper surfaces 34a of the rotary members 34.

A substantially cylindrical cam member 40 is rotatably supported to the lower surface of the base portion 7 of the base panel 5 (see FIG. 4).

Figure 6:
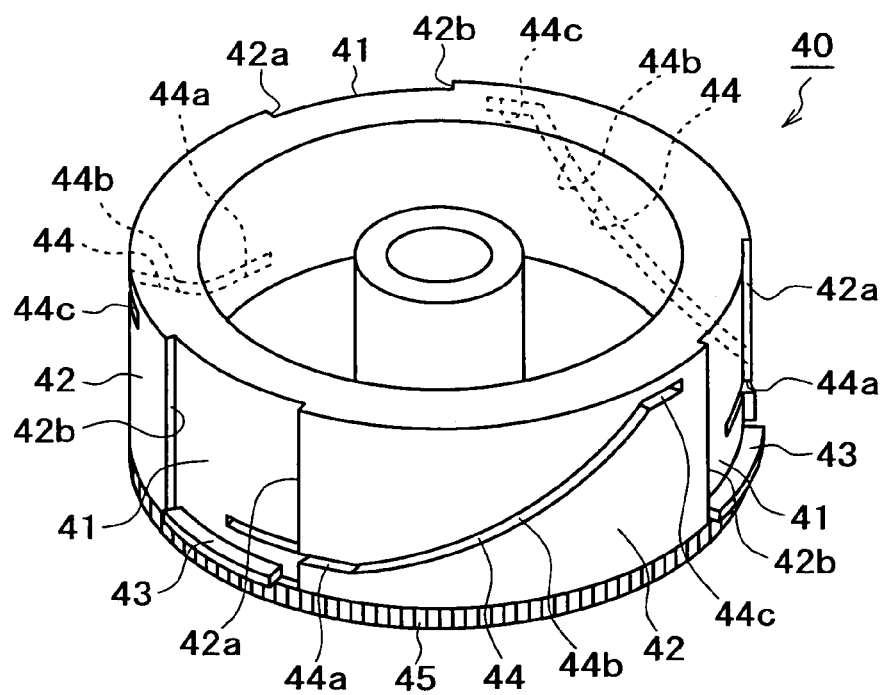
FIG. 6 is an enlarged perspective view of the cam member.

The cylindrical surface of the cam member 40 is formed with three recesses 41 (see FIG. 6). Each recess 41 has an arcuate bottom surface convex toward the outside. The cylindrical surface of the cam member 40 except the recesses 41 is formed as three outer cylindrical surfaces 42.

To form the recesses 41 on the cylindrical surface of the cam member 40, two step portions are formed between each recess 41 and each of the adjacent outer cylindrical surfaces 42 so as to be spaced apart from each other in the circumferential direction. Thus, three pairs of such step portions are formed in relation to the three recesses 41. Each pair of such step portions includes a first depressing portion 42a and a second depressing portion 42b.

A circumferentially elongated projection 43 having an arcuate shape convex toward the outside is formed on the bottom surface of each recess 41 at a lower end portion. The outer surface of each projection 43 is an outward convex arcuate surface. The outer surface of each projection 43 is positioned slightly outside of each outer cylindrical surface 42.

The cylindrical surface of the cam member 40 is formed with three cam grooves 44 equally spaced apart from each other in the circumferential direction. Each cam groove 44 is composed of a lower horizontal portion 44a, an inclined portion 44b inclined upward with an increase in circumferential distance from the lower horizontal portion 44a, and an upper horizontal portion 44c continuing to the inclined portion 44b. The lower horizontal portion 44a is formed astride each recess 41 and the outer cylindrical surface 42 adjacent thereto. The inclined portion 44b and the upper horizontal portion 44c are formed on each outer cylindrical surface 42.

A gear portion 45 is provided over a lower end portion of the cam member 40 so as to extend in the circumferential direction.

The cam member 40 is rotatably supported through a support shaft (not shown) to the base panel 5.

In the condition where the cam member 40 is supported to the base panel 5, the outer circumference of the cam member 40 is exposed to the locating recesses 8a.

The cam member 40 is rotated by transmitting a drive force of an operating motor (not shown) to the gear portion 45, in a direction according to the rotational direction of the operating motor.

The base unit 20 has a housing 46 in which various required members are arranged or supported. The housing 46 is composed of an upper case 47 and a lower case 48 connected together in the vertical direction (see FIGS. 1 and 7).

The upper case 47 is a longitudinally elongated, rectangular boxlike member opening to the lower side. The upper case 47 is composed of a top plate portion 47a, a peripheral wall portion 47b projecting downward from the peripheral edge of the top plate portion 47a, and a projecting portion 47c projecting further downward from the peripheral wall portion 47b. These portions 47a, 47b, and 47c are integrally formed. The projecting portion 47c is formed at a rear end portion of the upper case 47. Accordingly, the upper case 47 is formed with a recess 47d at a portion except the projecting portion 47c in such a manner that the depth of the recess 47d is equivalent to the height of the projecting portion 47c.

A first detection switch 49 is mounted on the lower surface of the top plate portion 47a of the upper case 47. Further, a positioning shaft 47e projects downward from the lower surface of the top plate portion 47a.

The lower case 48 is a longitudinally elongated, rectangular shallow boxlike member opening to the upper side. The lower case 48 is composed of a bottom plate portion 48a and a peripheral wall portion 48b projecting upward from the peripheral edge of the bottom plate portion 48a. These portions 48a and 48b are integrally formed.

Figure 8:
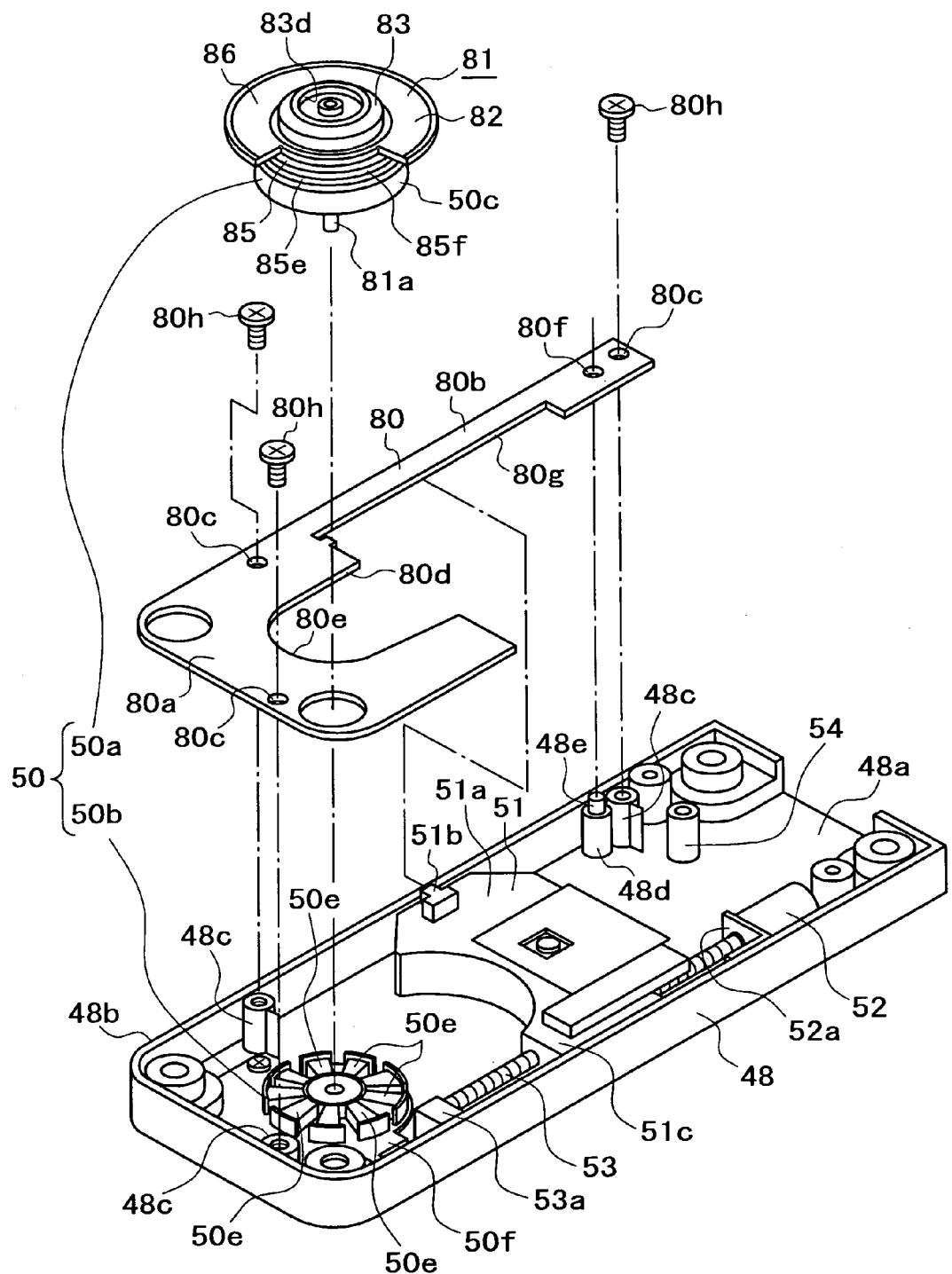
FIG. 8 is an enlarged exploded perspective view showing a part of the base unit.

Three mounting bosses 48c are provided in the lower case 48 so as to project upward from the bottom plate portion 48a of the lower case 48 and be spaced apart from each other in the longitudinal and lateral directions (see FIG. 8). Each mounting boss 48c is formed with a tapped hole opening to the upper side.

A positioning boss 48d is provided on the immediately front side of the rearmost mounting boss 48c so as to project upward from the bottom plate portion 48a. A positioning pin 48e projects upward from the upper end surface of the positioning boss 48d.

Figure 7:
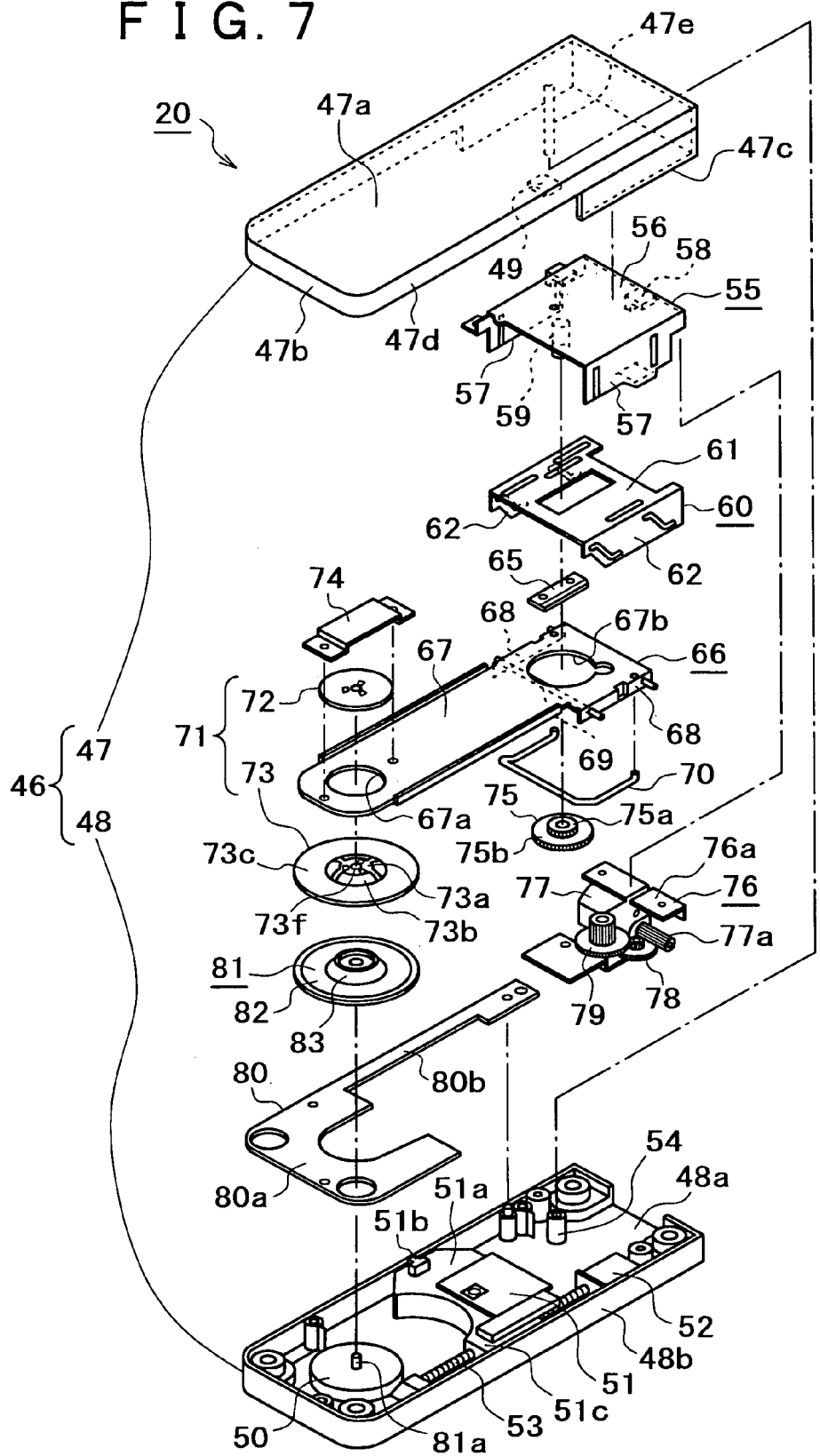
FIG. 7 is an exploded perspective view of a base unit.
Figure 10:
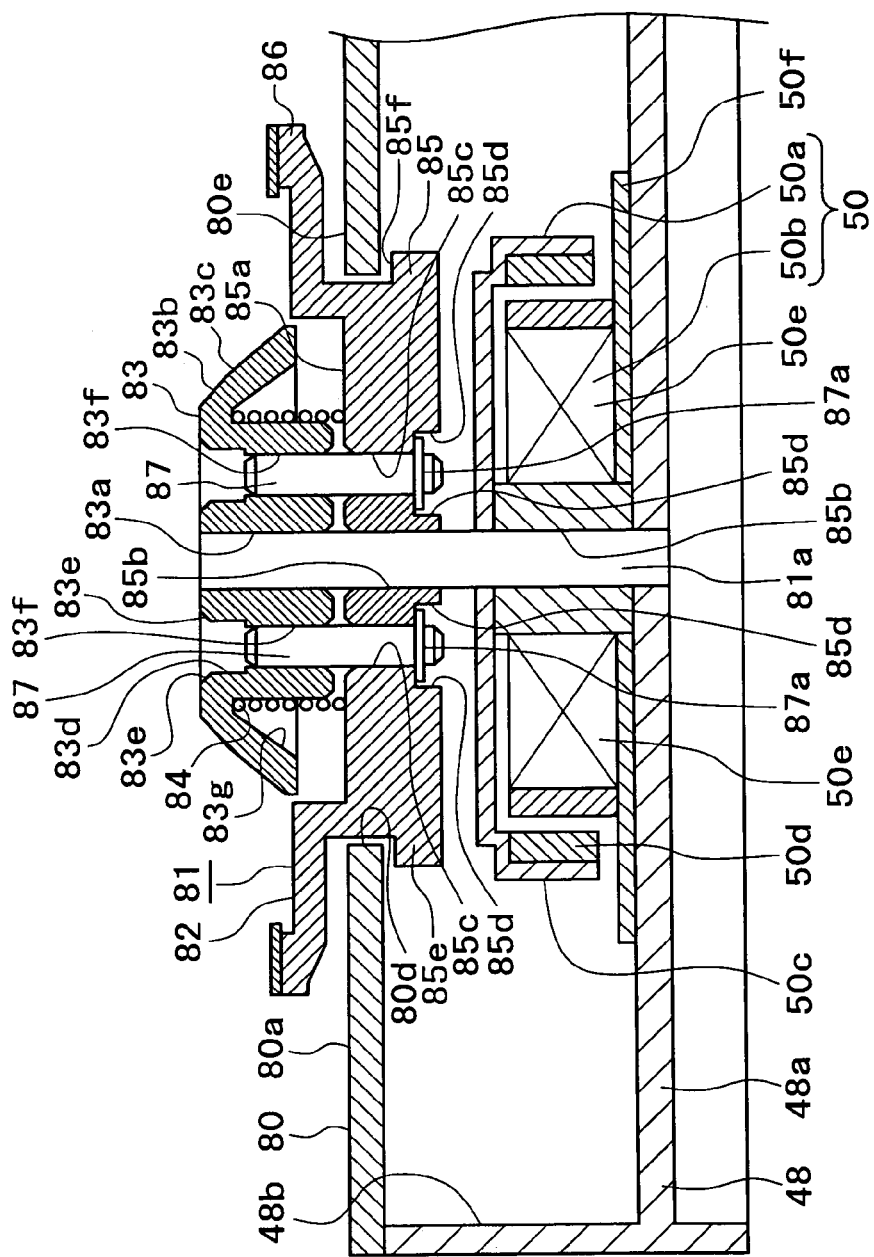
FIG. 10 is an enlarges sectional view showing a disk table and a spindle motor.

A spindle motor 50 is provided in the lower case 48 at a front end portion thereof (see FIGS. 7, 8, and 10). The spindle motor 50 is composed of a rotor 50a and a stator 50b. The rotor 50a is composed of a rotor case 50c and a magnet 50d mounted on the inner circumferential surface of the rotor case 50c. The stator 50b is composed of a plurality of stator coils 50e circumferentially spaced apart from each other and a stator board 50f on which the stator coils 50e are disposed.

An optical pickup 51 is supported in the lower case 48 so as to be movable in the longitudinal direction of the lower case 48 (see FIGS. 7 and 8). The optical pickup 51 has a moving base 51a, and guided portions 51b and 51c are provided at left and right side portions of the moving base 51a, respectively.

Figure 9:
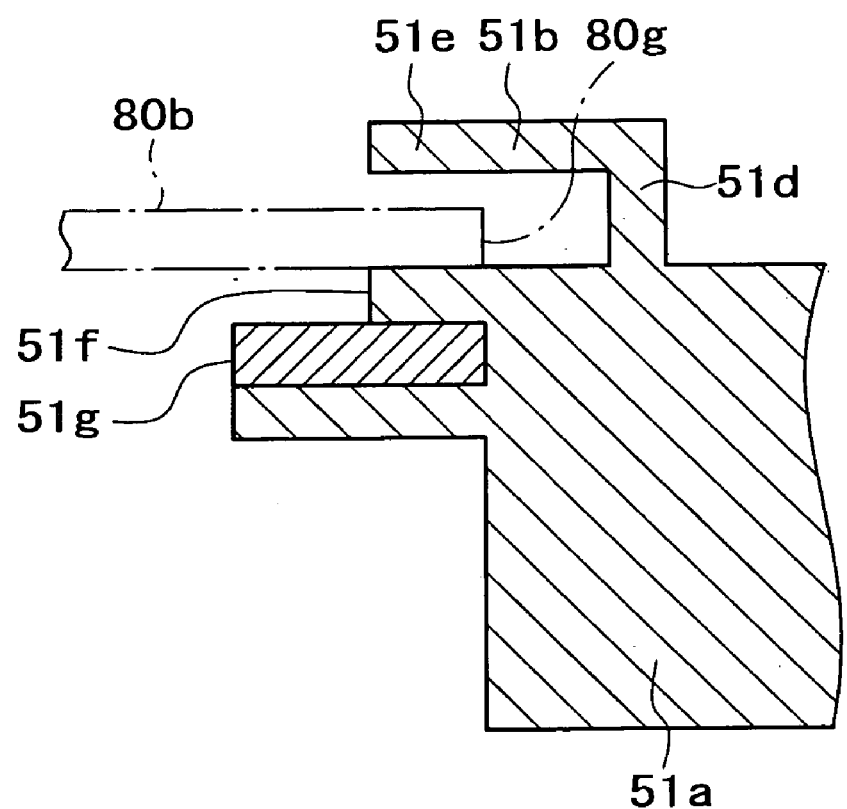
FIG. 9 is an enlarged sectional view showing the relation between a guided portion of an optical pickup and a guiding portion of an installation plate.

As shown in FIG. 9, the guided portion 51b has a substantially U-shaped configuration opening to the left side. More specifically, the guided portion 51b is composed of a base portion 51d extending vertically, an upper engaging portion 51e projecting leftward from the upper end of the base portion 51d, and a lower engaging portion 51f projecting leftward from the lower end of the base portion 51d. The lower engaging portion 51f is formed as a part of the moving base 51a and is provided with a magnet 51g.

The guided portion 51c is a cylindrical member having a tapped through hole (not shown) extending in the longitudinal direction of the guided portion 51c.

A stepping motor 52 and a lead screw 53 adapted to be rotated by the stepping motor 52 are provided in the lower case 48 (see FIGS. 7 and 8). A bracket 52a is mounted on the inner surface of the peripheral wall portion 48b of the lower case 48, and the stepping motor 52 is mounted through the bracket 52a to the lower case 48. A bearing member 53a is mounted on the upper surface of the bottom plate portion 48a of the lower case 48, and the lead screw 53 is rotatably supported at its front end portion to the bearing member 53a.

The lead screw 53 is inserted through the guided portion 51c of the optical pickup 51 and is threadedly engaged with the tapped through hole of the guided portion 51c. When the stepping motor 52 is operated, the moving base 51a of the optical pickup 51 is moved frontward or rearward according to the rotational direction of the stepping motor 52.

A positioning cylinder 54 is provided at a rear end portion of the bottom plate portion 48a of the lower case 48 so as to project upward.

The upper case 47 and the lower case 48 are connected together by screws, for example, in the condition where the lower end surface of the projecting portion 47c is in contact with the upper end surface of the peripheral wall portion 48b, thus configuring the housing 46. Since the upper case 47 has the recess 47d, an insertion space 46a for allowing insertion of the disk 100 is defined between the upper case 47 and the lower case 48 in the condition where the housing 46 is configured (see FIG. 1).

Figure 14:
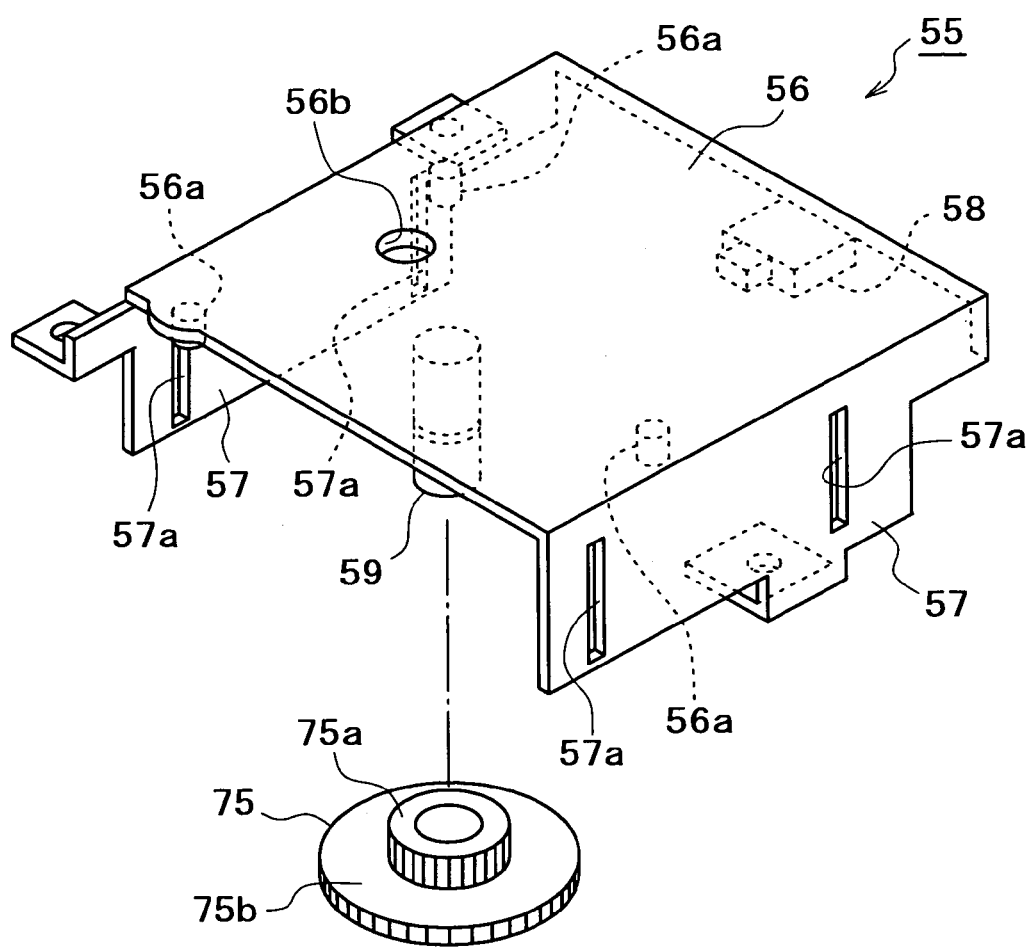
FIG. 14 is an enlarged perspective view showing a guide member and a drive gear.

A guide member 55 is mounted on the lower surface of the upper case 47 (see FIG. 7). As shown in FIG. 14, the guide member 55 is composed of an upper plate portion 56 and a pair of side plate portions 57 projecting downward from the opposite side edges of the upper plate portion 56. These portions 56 and 57 are integrally formed.

A second detection switch 58 is mounted on the lower surface of the upper plate portion 56 at its rear end portion. Further, three guide pins 56a project downward from the lower surface of the upper plate portion 56. Further, a gear support shaft 59 projects downward from the lower surface of the upper plate portion 56. The upper plate portion 56 is formed with a shaft insertion hole 56b.

Each side plate portion 57 is formed with two guide holes 57a vertically elongated and spaced apart from each other in the longitudinal direction.

Figure 15:
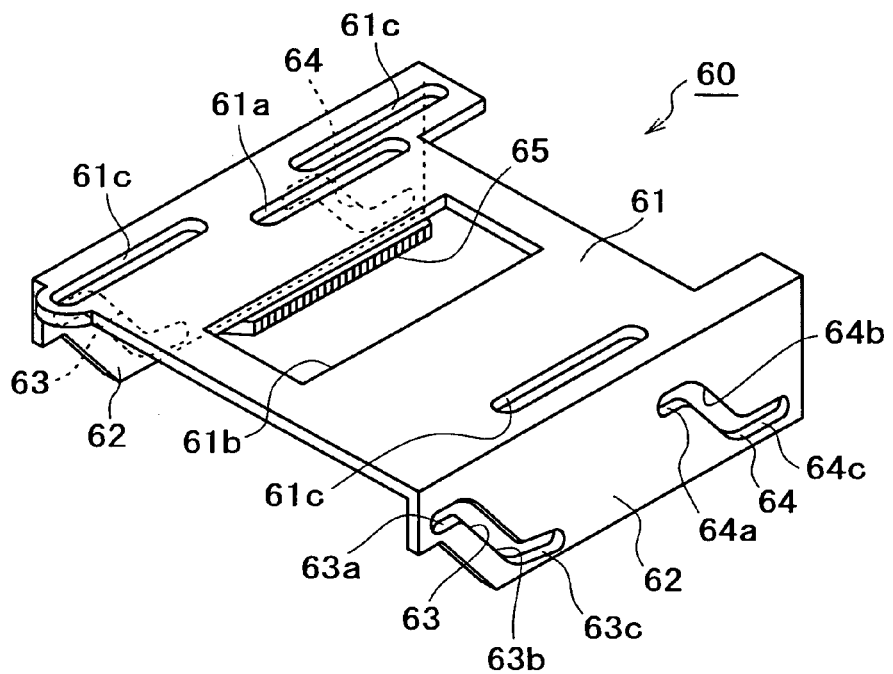
FIG. 15 is an enlarged perspective view showing a cam slider.

A cam slider 60 is supported to the guide member 55 so as to be movable in the longitudinal direction (see FIG. 7). As shown in FIG. 15, the cam slider 60 is composed of an upper plate portion 61 and a pair of side plate portions 62 projecting downward from the opposite side edges of the upper plate portion 61. These portions 61 and 62 are integrally formed.

The upper plate portion 61 is formed with a first relief hole 61a and a second relief hole 61b spaced apart from each other in the lateral direction. These relief holes 61a and 61b are elongated in the longitudinal direction. Further, the upper plate portion 61 is formed with three guide holes 61c at opposite side portions.

Figure 16:
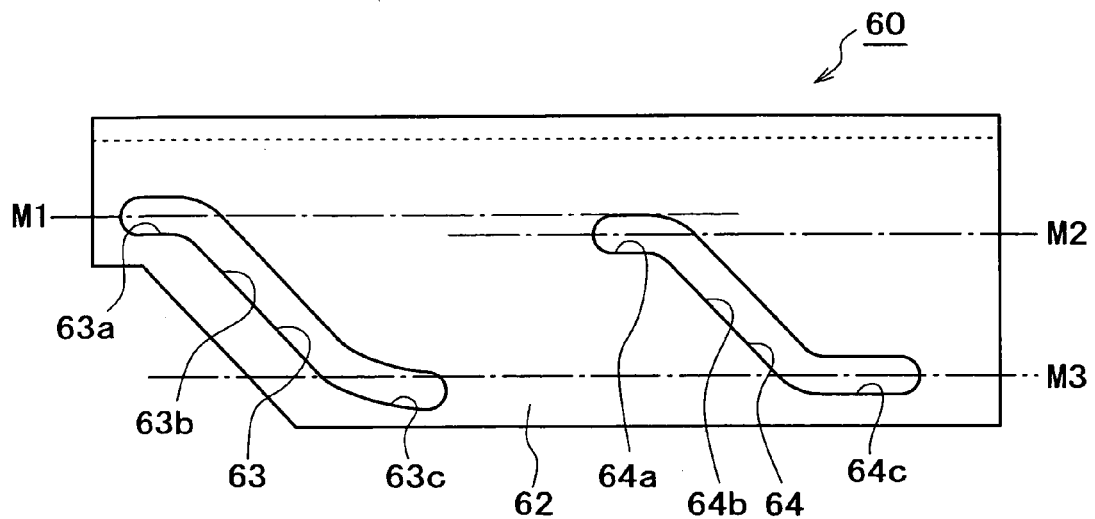
FIG. 16 is an enlarged side view of the cam slider.

Each side plate portion 62 is formed with a front cam hole 63 and a rear cam hole 64 spaced apart from each other in the longitudinal direction (see FIGS. 15 and 16). The front cam hole 63 is composed of a horizontal portion 63a extending in the longitudinal direction, an inclined portion 63b continuing to the rear end of the horizontal portion 63a and inclined downward to the rear side, and a working portion 63c continuing to the rear end of the inclined portion 63b and slightly inclined downward to the rear side. Accordingly, the inclination angle of the working portion 63c with respect to the horizontal portion 63a is smaller than that of the inclined portion 63b. The rear cam hole 64 is composed of a horizontal portion 64a extending in the longitudinal direction, an inclined portion 64b continuing to the rear end of the horizontal portion 64a and inclined downward to the rear side, and a working portion 64c continuing to the rear end of the inclined portion 64b and extending in the longitudinal direction.

The horizontal portion 63a of the front cam hole 63 is located at a level slightly higher than that of the horizontal portion 64a of the rear cam hole 64. More specifically, as shown in FIG. 16, the vertically central line M1 of the horizontal portion 63a is at a level higher than the vertically central line M2 of the horizontal portion 64a.

As mentioned above, the working portion 63c of the front cam hole 63 is slightly inclined downward to the rear side, and a front end portion of the working portion 63c is located at the same level as that of the working portion 64c of the rear cam hole 64. As shown in FIG. 16, a rear end portion of the working portion 63c of the front cam hole 63 is located at a level lower than that of the vertically central line M3 of the working portion 64c of the rear cam hole 64.

A rack member 65 is mounted on the lower surface of the upper plate portion 61 of the cam slider 60 (see FIGS. 7 and 15).

Figure 17:
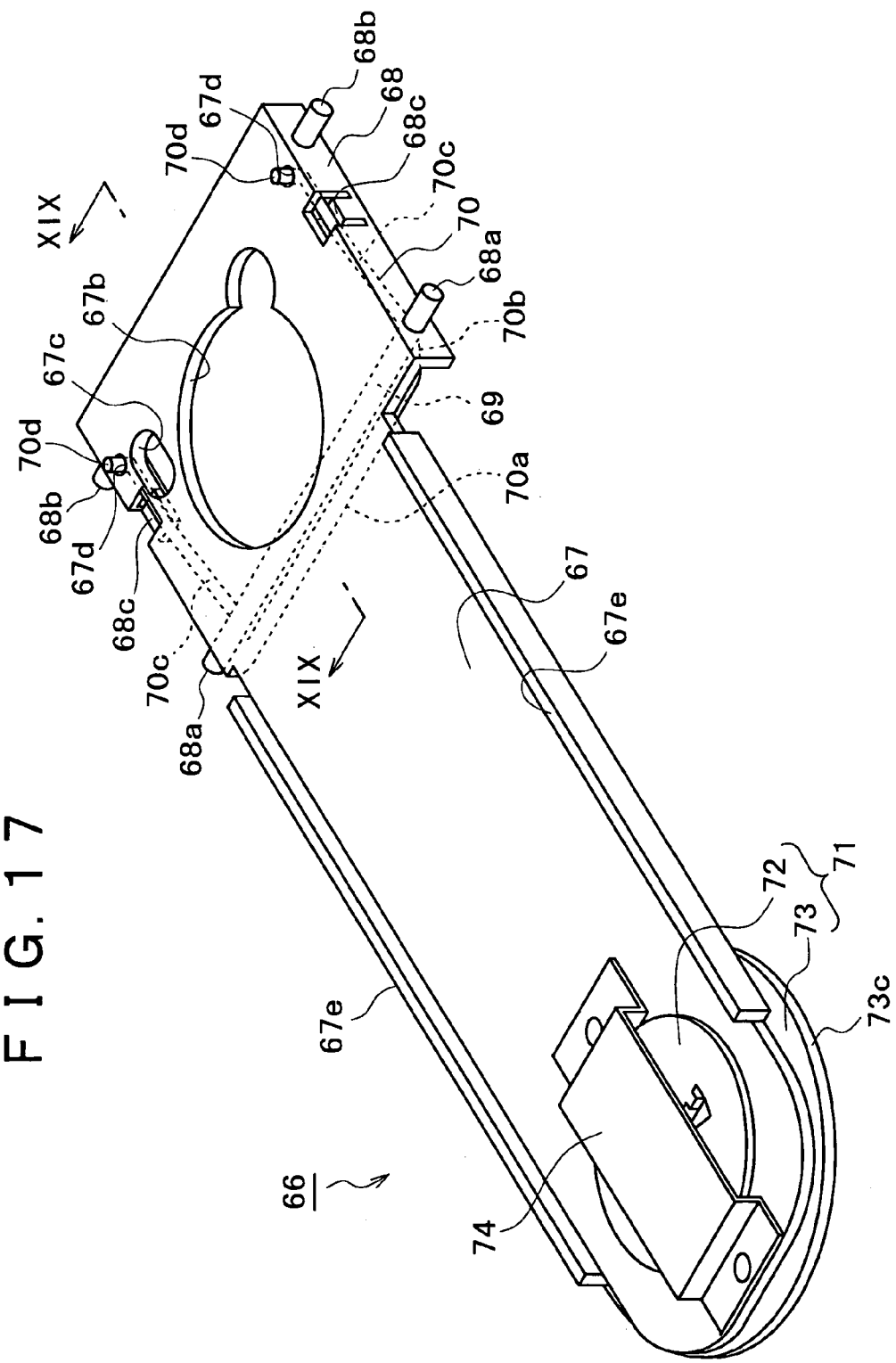
FIG. 17 is an enlarged perspective view showing a support arm and a chucking pulley.

A support arm 66 is supported to the cam slider 60 and the guide member 55 (see FIG. 7). As shown in FIG. 17, the support arm 66 is composed of an arm plate 67 elongated in the longitudinal direction and a pair of side plates 68 projecting downward from the opposite side edges of a rear end portion of the arm plate 67. The arm plate 67 and the side plates 68 are integrally formed.

As shown in FIG. 7, a support hole 67a is formed at a front end portion of the arm plate 67, and a gear mounting hole 67b is formed at a rear end portion of the arm plate 67. Further, a shaft insertion hole 67c is formed in the vicinity of the gear mounting hole 67b of the arm plate 67. Further, a pair of spring support holes 67d are formed near the opposite side edges of the arm plate 67 and near the rear end of the arm plate 67.

A pair of reinforcing ribs 67e are provided on the opposite side edges of the arm plate 67 at a portion except the front and rear end portions. The reinforcing ribs 67e are formed by 90° upward bending a part of the arm plate 67.

Each side plate 68 is provided with a front supported shaft 68a and a rear supported shaft 68b projecting outward and spaced apart from each other in the longitudinal direction. A connecting shaft 69 for connecting the front supported shafts 68a of the right and left side plates 68 is provided between these side plates 68. That is, the connecting shaft 69 extends between the inner surfaces of the two side plates 68.

A pair of spring support lugs 68c are provided at upper end portions of the side plates 68. Each spring support lug 68c is formed by inward bending a part of the corresponding side plate 68, and a predetermined space is defined between each spring support lug 68c and the arm plate 67 (see FIG. 19).

Figure 19:
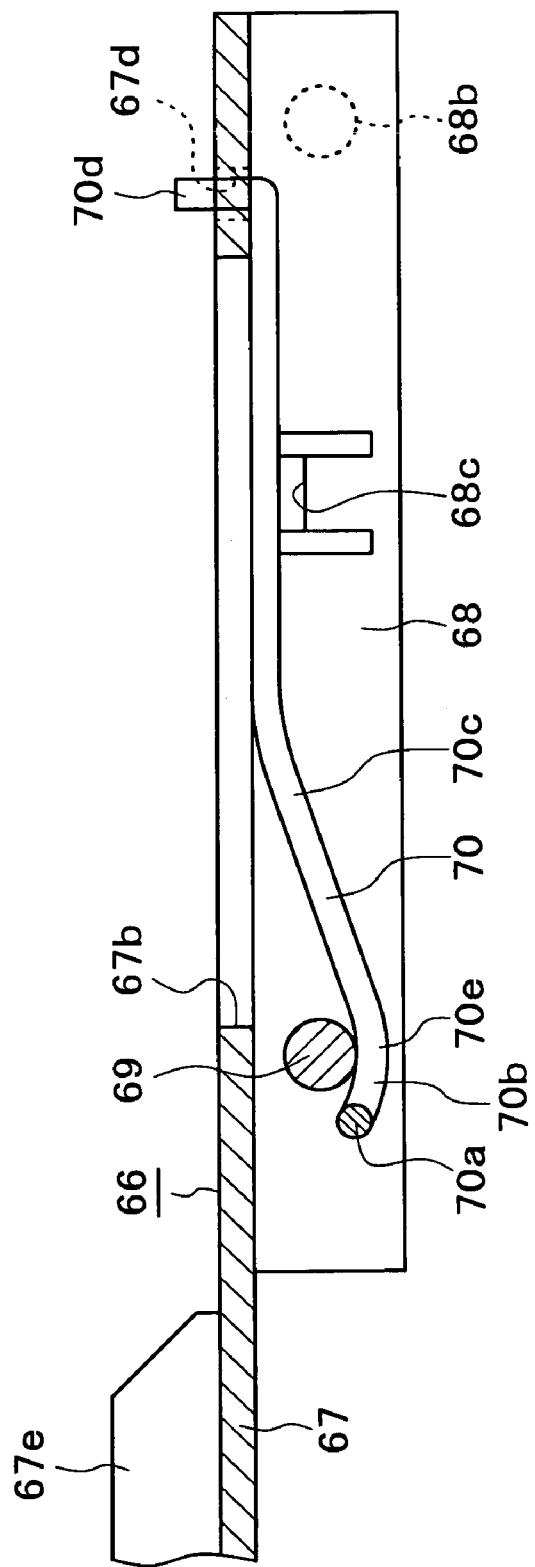
FIG. 19 is an enlarged cross section taken along the line XIX—XIX in FIG. 17.

A wire spring 70 is supported to the support arm 66 (see FIGS. 7, 17, and 19). The wire spring 70 is composed of a base portion 70a extending in the lateral direction, a pair of front deformed portions 70b projecting rearward from the right and left ends of the base portion 70a, a pair of rear deformed portions 70c projecting rearward from the rear ends of the front deformed portions 70b, and a pair of supported portions 70d projecting upward from the rear ends of the rear deformed portions 70c. These portions 70a, 70b, 70c, and 70d are integrally formed. The joint between each front deformed portion 70b and the corresponding rear deformed portion 70c on the same side is formed as an elastic contact portion 70e slightly bent.

The supported portions 70d of the wire spring 70 are inserted into the spring support holes 67d of the arm plate 67, and the rear portions of the rear deformed portions 70c of the wire spring 70 are inserted between the spring support lugs 68c and the arm plate 67. In this condition, the elastic contact portions 70e of the wire spring 70 are brought into elastic contact with the connecting shaft 69 from the lower side thereof, thereby supporting the wire spring 70 to the support arm 66.

Figure 18:
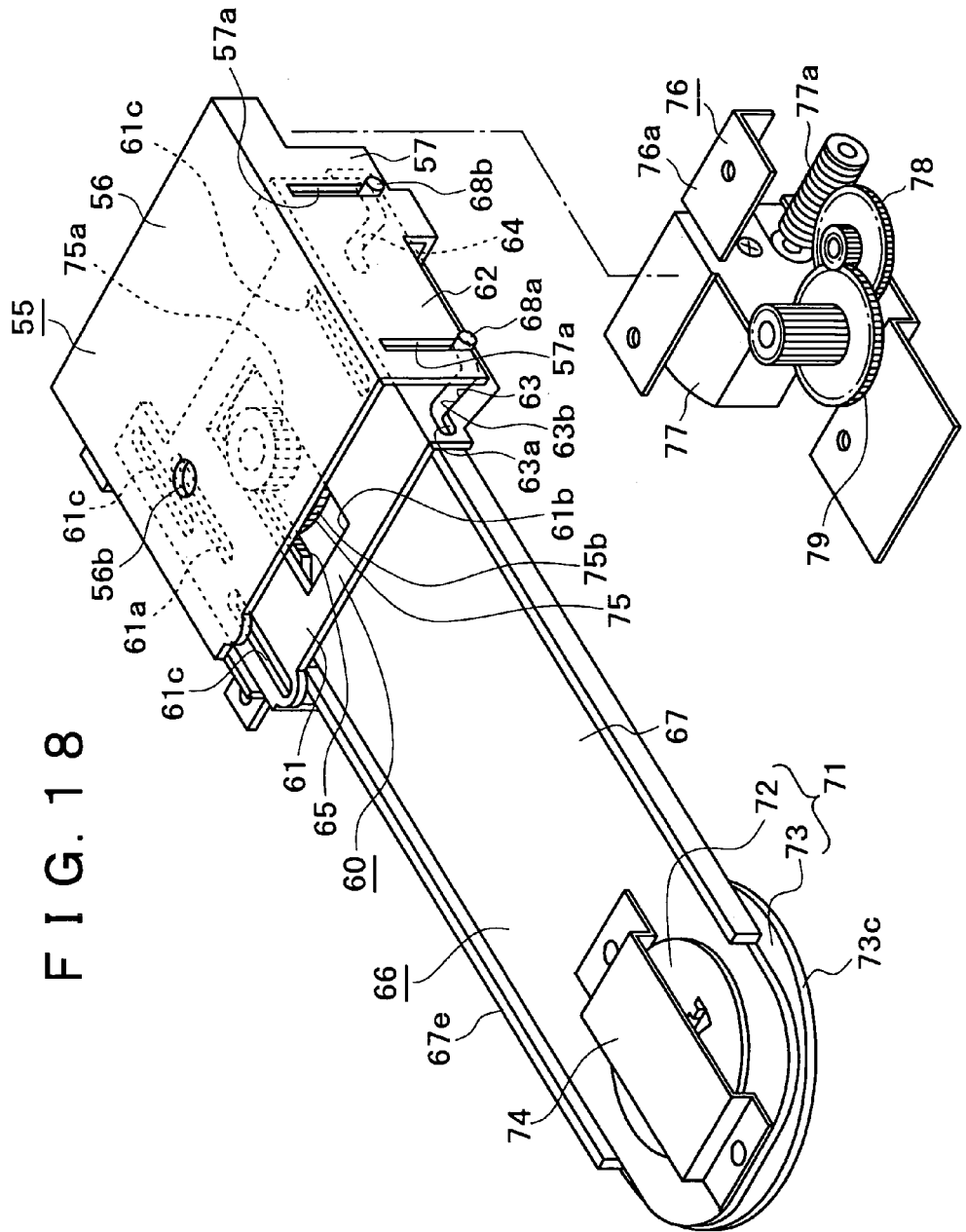
FIG. 18 is an enlarged perspective view showing a condition where the support arm is supported to the guide member and the cam slider and a drive unit is separated from the guide member.

As shown in FIG. 18, the support arm 66 is supported to the cam slider 60 and the guide member 55 in the following manner. The front supported shafts 68a of the support arm 66 are inserted through the front cam holes 63 of the cam slider 60 and the front guide holes 57a of the guide member 55. The rear supported shafts 68b of the support arm 66 are inserted through the rear cam holes 64 of the cam slider 60 and the rear guide holes 57a of the guide member 55. Accordingly, when the cam slider 60 is moved in the longitudinal direction relative to the guide member 55, the front guided shafts 68a and the rear guided shafts 68b of the support arm 66 are guided by the front and rear guide holes 57a of the guide member 55 according to the positions of the front guided shafts 68a to the front cam holes 63 and the positions of the rear guided shafts 68b to the rear cam holes 64, thereby moving the support arm 66 in the vertical direction.

Figure 20:
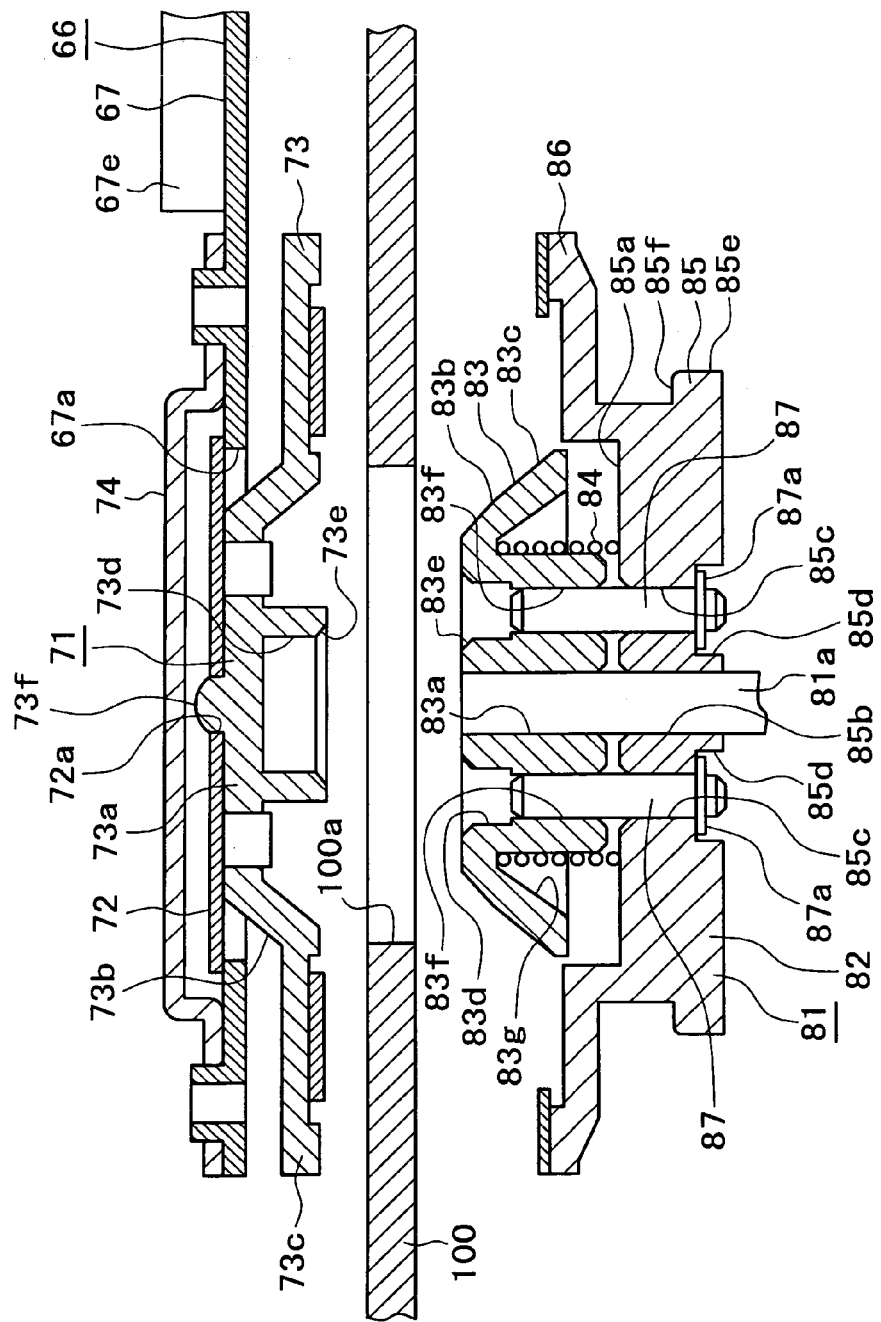
FIG. 20 is an enlarged sectional view showing the chucking pulley and the disk table.
Figure 22:
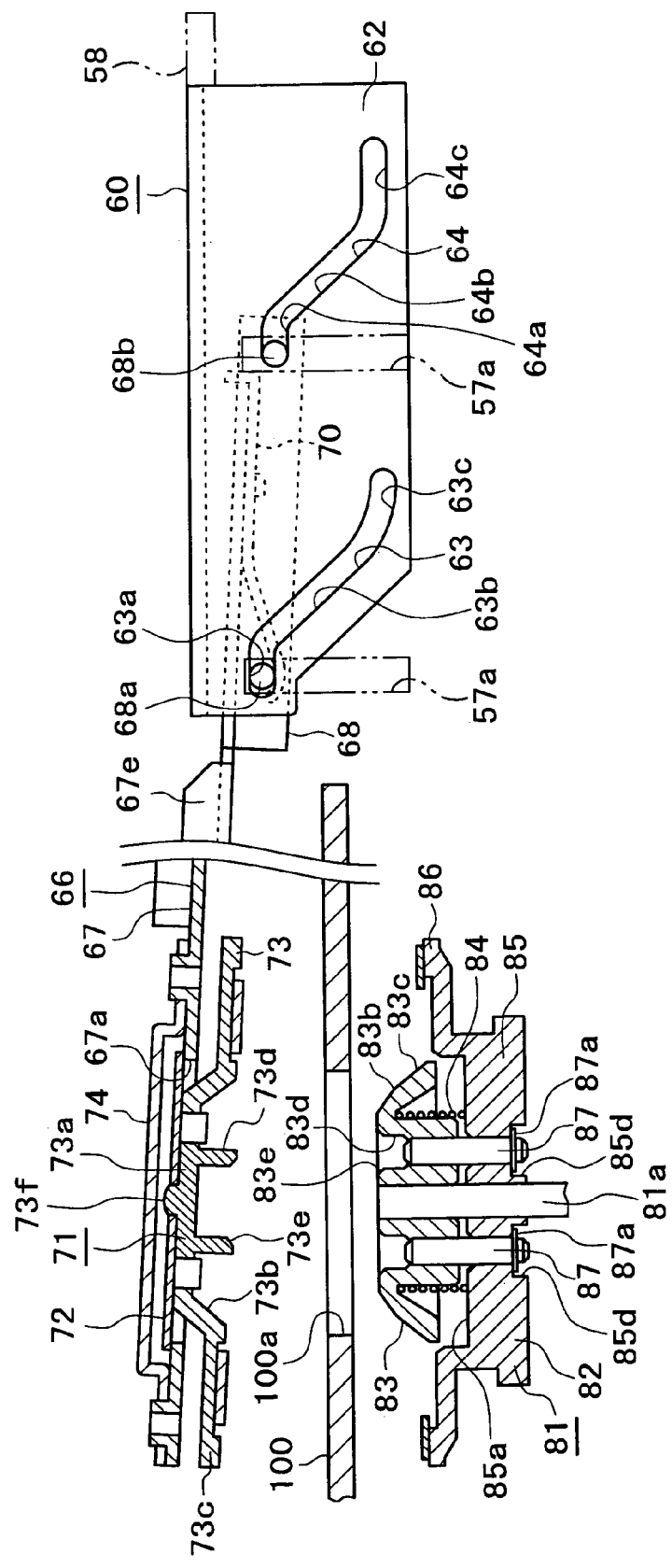
FIG. 22 is a partially sectional, side view showing a condition where a disk-shaped recording medium is inserted between the chucking pulley and the disk table.

The support arm 66 supports a chucking pulley 71 (see FIGS. 7, 17, 20). The chucking pulley 71 is formed such that a support plate 72 is coupled on a depression member 73.

The support plate 72 is a disk-shaped member having a diameter larger than that of the support hole 67a of the support arm 66. A projection insertion hole 72a is formed at a central portion of the support plate 72.

As shown in FIG. 20, the depression member 73 is composed of a circular mounted portion 73a, a conical portion 73b projecting obliquely downward from the outer circumference of the mounted portion 73a, an annular depressing portion 73c continuing to the lower end of the conical portion 73b, and a cylindrical positioning projection 73d projecting downward from the lower surface of the mounted portion 73a. The inner circumferential edge of the lower end of the positioning projection 73d is formed as a guided edge 73e diverged to the lower side. An upward convex, semispherical pivot projection 73f is formed at a central portion of the mounted portion 73a.

The chucking pulley 71 is supported to the support arm 66 in such a manner that the mounted portion 73a and the conical portion 73b of the depression member 73 are inserted into the support hole 67a from the lower side and the mounted portion 73a is next mounted to the support plate 72. In the condition where the depression member 73 is mounted to the support plate 72, the pivot projection 73f projects upward from the support plate 72 at the projection insertion hole 72a. In the condition where the chucking pulley 71 is supported to the support arm 66, the chucking pulley 71 is rotatable about its axis and movable in the axial direction (vertical direction).

In the condition where the chucking pulley 71 is supported to the support arm 66, a cover plate 74 is mounted on the upper surface of the arm plate 67 so as to cover the upper side of the support plate 72.

In the condition where the support arm 66 is supported to the guide member 55 and the cam slider 60, the gear support shaft 59 of the guide member 55 is inserted through the second relief hole 61b of the cam slider 60. A drive gear 75 as a two-stage gear is supported to the gear support shaft 59 (see FIG. 7). The drive gear 75 is located in the gear mounting hole 67b of the support arm 66, and a small-diameter portion 75a of the drive gear 75 is in mesh with the rack member 65 mounted on the cam slider 60.

A drive unit 76 is mounted on the lower surface of the upper plate portion 56 of the guide member 55 at a rear end portion thereof (see FIG. 7). As shown in FIG. 18, the drive unit 76 is composed of a mounting plate 76a, a lifting motor 77 mounted on the mounting plate 76a, a first reduction gear 78 supported to the mounting plate 76a, and a second reduction gear 79 supported to the mounting plate 76a. A worm 77a is fixed to a motor shaft of the motor 77. The first reduction gear 78 is in mesh with the worm 77a, and the second reduction gear 79 is in mesh with the first reduction gear 78.

In the condition where the drive unit 76 is mounted on the guide member 55, the second reduction gear 79 is in mesh with a large-diameter portion 75b of the drive gear 75. Accordingly, when the motor 77 is operated, a drive force of the motor 77 is transmitted through the first reduction gear 78, the second reduction gear 79, and the drive gear 75 in this order to the rack member 65, thereby moving the cam slider 60 in the frontward or rearward direction according to the rotational direction of the motor 77.

An installation plate 80 is mounted on the lower case 48 of the housing 46 (see FIGS. 7 and 8). The installation plate 80 is composed of a front holding portion 80a and an extended portion 80b projecting rearward from the rear end of the holding portion 80a on the left side thereof. These portions 80a and 80b are integrally formed. The installation plate 80 is formed with three screw insertion holes 80c spaced apart from each other in the longitudinal and lateral directions (see FIG. 8). These screw insertion holes 80c are formed at positions corresponding to the mounting bosses 48c provided in the lower case 48.

The holding portion 80a is formed with a substantially U-shaped recess opening to the rear side. The opening edge of this recess is formed as a restricting portion 80d. The restricting portion 80d has an arcuate portion 80e having a central angle of about 180°.

A positioning hole 80f is formed at a rear end portion of the extended portion 80b. The right side edge of the other portion of the extended portion 80b except the rear end portion is formed as a guiding portion 80g engaged with the guided portion 51b of the optical pickup 51. Accordingly, the guided portion 51b of the moving base 51a of the optical pickup 51 is slidably supported to the guiding portion 80g.

The installation plate 80 is mounted to the lower case 48 in such a manner that the positioning pin 48e of the lower case 48 is inserted into the positioning hole 80f to thereby position the installation plate 80 with respect to the lower case 48, and that mounting screws 80h are next inserted through the screw insertion holes 80c and threadedly engaged with the tapped holes of the mounting bosses 48c, respectively.

In the condition where the support arm 66 is supported to the guide member 55 and the cam holder 60, the positioning shaft 47e of the upper case 47 is inserted through the shaft insertion hole 56b of the guide member 55, the first relief hole 61a of the cam holder 60, and the gear mounting hole 67b of the support arm 66. In connecting the upper case 47 and the lower case 48, the positioning shaft 47e is inserted into the positioning cylinder 54 of the lower case 48 to thereby position the upper case 47 with respect to the lower case 48. Accordingly, the upper case 47 and the lower case 48 can be easily positioned with respect to each other, and the workability in assembling the base unit 20 can be improved.

A disk table 81 is supported to the spindle motor 50 located in the lower case 48 (see FIGS. 7, 8, and 10).

The disk table 81 is composed of a center shaft 81a provided by the motor shaft of the spindle motor 50, a table member 82, a centering projection 83, and a biasing spring 84 (see FIG. 10). The biasing spring 84 functions as means for upward biasing the centering projection 83 with respect to the table member 82.

The table member 82 is composed of a base portion 85 having a circular external shape and a flanged mounting portion 86 projecting radially outward from the outer circumference of the base portion 85. The base portion 85 is formed with a locating recess 85a opening to the upper side. The base portion 85 is further formed with a central fixing hole 85b passing vertically and two shaft support holes 85c passing vertically at 180° opposite positions with respect to the fixing hole 85b. The base portion 85 is further formed with two restricting recesses 85d respectively continuing to the lower ends of the shaft support holes 85c. Each restricting recess 85d opens to the lower side and has an opening area larger than that of each shaft support hole 85c.

The base portion 85 is formed at its lower end with a radially outward projection 85e extending in the circumferential direction. Accordingly, a groove opening to the radial outside and extending in the circumferential direction is formed between the projection 85e and the mounting portion 86. This groove is formed as a restricted groove 85f.

The restricting portion 80d of the installation plate 80 is inserted into the restricted groove 85f of the base portion 85.

The center shaft 81a is inserted and fixed in the fixing hole 85b of the table member 82. The center shaft 81a is press-fitted with the rotor case 50c of the spindle motor 50, so that the center shaft 81a is rotated together with the rotor 50a.

The centering projection 83 is partially disposed in the locating recess 85a of the table member 82. The centering projection 83 is formed with a central supported hole 83a, and the center shaft 81a is inserted at its upper end portion in the central supported hole 83a. Thus, the centering projection 83 is axially movably supported to the center shaft 81a. The centering projection 83 has a substantially conical outer circumferential surface including an upper guiding conical surface 83b and a lower centering conical surface 83c. The inclination angle of the guiding conical surface 83*b* with respect to the axial direction of the center shaft 81*a* is set larger than that of the centering conical surface 83*c*.

The centering projection 83 is further formed with an annular positioning recess 83*d*. The annular positioning recess 83*d* is formed around the supported hole 83*a* and opens to the upper side. The inner circumferential edge of the positioning recess 83*d* is inclined radially inward to the upper side to form a guide edge 83*e*.

The centering projection 83 is further formed with two shaft fixing holes 83*f* at 180° opposite positions with respect to the supported hole 83*a*. The shaft fixing holes 83*f* extend vertically and open to the lower side.

The centering projection 83 is further formed with a spring support recess 83*g*. The spring support recess 83*g* is formed around the supported hole 83*a* and opens to the lower side.

A biasing spring 84 as a compression coil spring is located in the spring support recess 83*g*. The biasing spring 84 is in elastic contact with the table member 82 and the centering projection 83. Accordingly, the centering projection 83 is upward biased by the biasing spring 84 with respect to the table member 82 fixed to the center shaft 81*a*, and a given space for allowing vertical movement of the centering projection 83 is defined between the bottom surface of the locating recess 85*a* of the table member 82 and the lower end surface of the centering projection 83.

Two disconnection prevention shafts 87 are inserted through the two shaft support holes 85*c* of the table member 82, respectively. Upper portions of the two disconnection prevention shafts 87 are inserted and fixed in the two shaft fixing holes 83*f* of the centering projection 83, respectively. The disconnection prevention shafts 87 are slidable to the shaft support holes 85*c*.

A disconnection preventing portion 87*a* such as a so-called E ring is provided at a lower end portion of each disconnection prevention shaft 87. Each disconnection preventing portion 87*a* is located in the corresponding restricting recess 85*d* of the table member 82 and abuts against the upper surface of the corresponding restricting recess 85*d* to thereby prevent disconnection of the centering projection 83 biased upward by the biasing spring 84 from the center shaft 81*a*.

During insertion of the centering projection 83 into the center hole 100*a* of the disk 100 from the lower side thereof, the inner circumference of the disk 100 is guided by the guiding conical surface 83*b* of the centering projection 83 and comes into contact with the centering conical surface 83*c*. After insertion of the centering projection 83 into the center hole 100*a* of the disk 100, the chucking pulley 71 is lowered to hold the inner circumferential portion of the disk 100 in cooperation with the disk table 81, thus chucking the disk 100.

At this time, the guided edge 73*e* of the positioning projection 73*d* of the chucking pulley 71 is guided by the guide edge 83*e* of the positioning recess 83*d* of the disk table 81, and the positioning projection 73*d* is inserted into the positioning recess 83*d* to thereby position the chucking pulley 71 and the disk table 81. At the same time, in the condition where the inner circumference of the disk 100 is in contact with the centering conical surface 83*c* of the centering projection 83, the disk 100 and the centering projection 83 are lowered together against the biasing force of the biasing spring 84 in concert with the lowering of the chucking pulley 71, thereby positioning (centering) the disk 100 with respect to the center shaft 81*a*.

As mentioned above, the centering projection 83 is movable relative to the table member 82 in the axial direction of the center shaft 81*a*. Accordingly, variations in diameter of the center hole 10*a* of the disk 100 can be absorbed and the centering of the disk 100 with respect to the center shaft 81*a* can be performed with good accuracy.

In the chucked condition of the disk 100, the chucking pulley 71 is in pressure contact with the disk 100 depressed on the mounting portion 86 of the table member 82.

While the two disconnection prevention shafts 87 are provided on the disk table 81 in this preferred embodiment, the number of such disconnection prevention shafts is arbitrary. In the case that three or more disconnection prevention shafts are provided, these shafts are preferably located at circumferentially equal intervals about the center shaft 81*a* and at the same radial distance from the center shaft 81*a*.

The procedure of mounting the installation plate 80 to the lower case 48 will now be described (see FIGS. 11 to 13).

Figure 11:
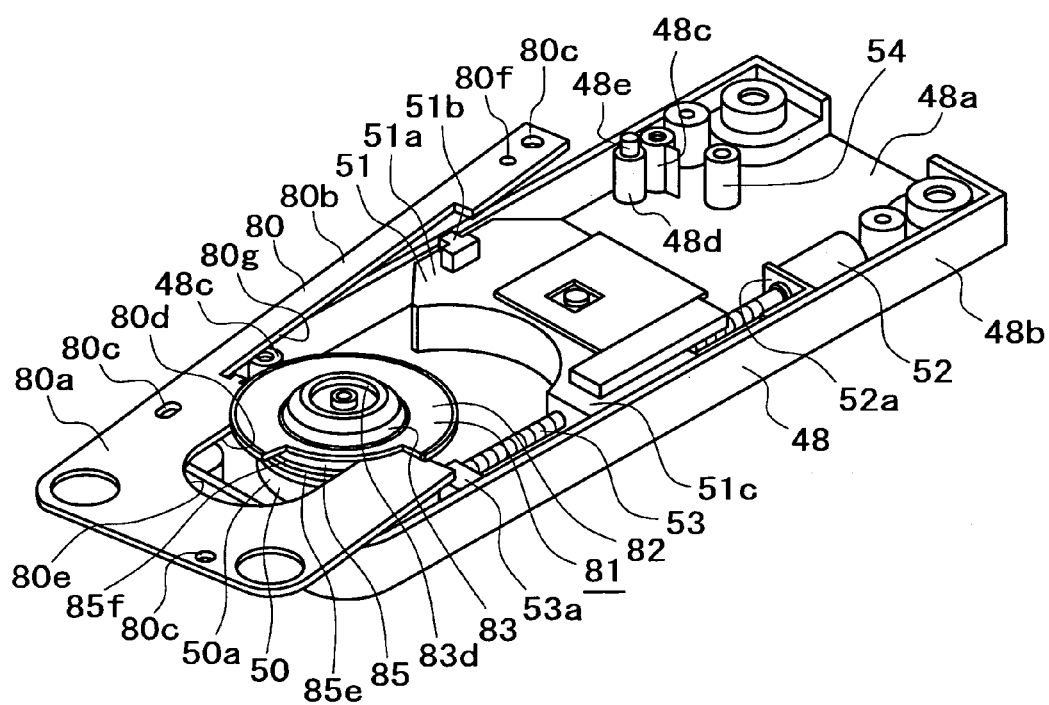
FIG. 11 is an enlarged perspective view showing a condition where a restricting portion of the installation plate is about to be inserted into a restricted groove of the disk table in the procedure of mounting the installation plate to a lower case.

First, the installation plate 80 is slid on the lower case 48 from the front side to insert the restricting portion 80*d* into the restricted groove 85*f* of the disk table 81 (see FIG. 11).

Thus, the restricting portion 80*d* of the installation plate 80 is inserted into the restricted groove 85*f* of the disk table 81. Accordingly, even when a force of moving the disk table 81 away from the spindle motor 50 (i.e., in the upward direction) is applied because of external vibrations, during driving of the optical pickup 51, or during transportation of the disk drive 1, for example, such movement of the disk table 81 is restricted by the restricting portion 80*d*, thereby preventing disconnection of the disk table 81.

Figure 12:
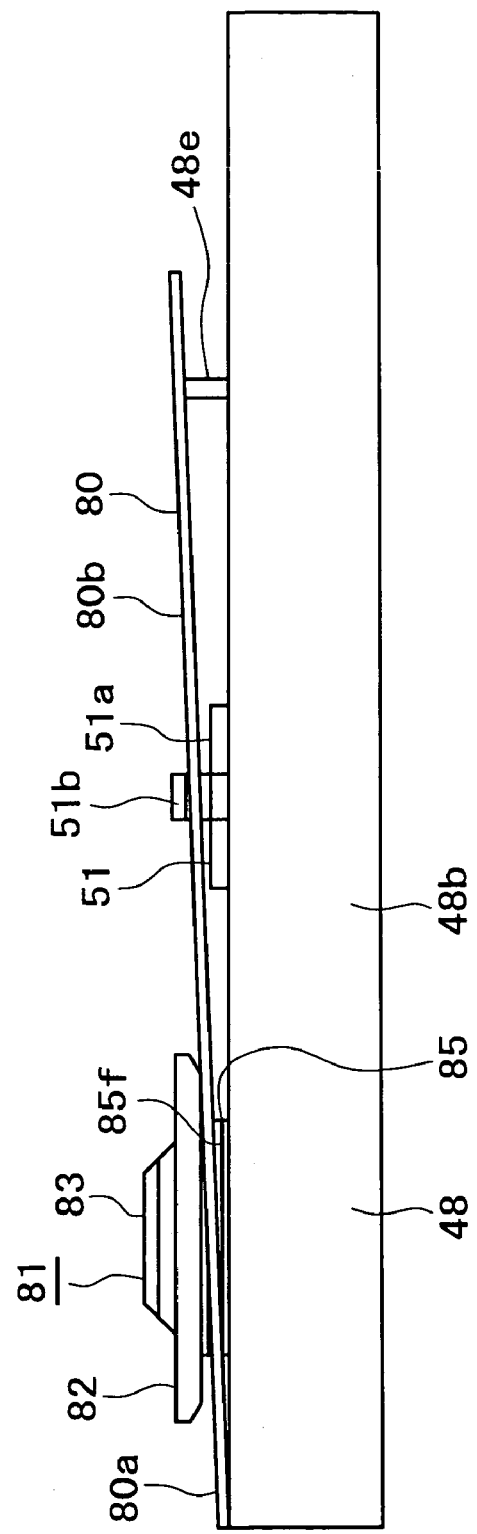
FIG. 12 is an enlarged side view showing a condition where an extended portion of the installation plate is engaged with the guided portion of the optical pickup, subsequent to the condition shown in FIG. 11.
Figure 13:
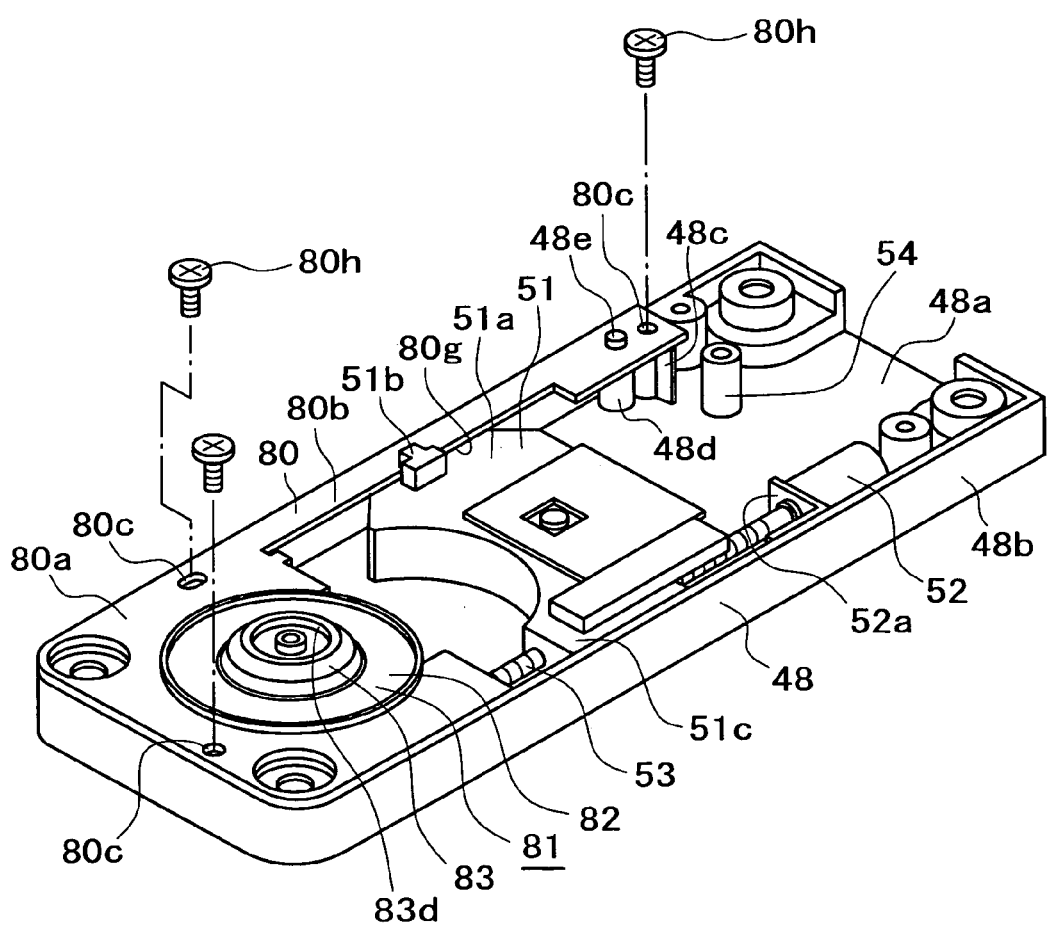
FIG. 13 is an enlarged perspective view showing a condition where the installation plate is positioned to the lower case, subsequent to the condition shown in FIG. 12.

In the next step, the guiding portion 80*g* of the extended portion 80*b* is inserted between the upper engaging portion 51*e* and the lower engaging portion 51*f* of the guided portion 51*b* of the optical pickup 51 (see FIG. 12). At this time, the extended portion 80*b* is slightly inclined upward to the rear side to insert the guiding portion 80*g* through the guided portion 51*b* and to put the rear end portion of the extended portion 80*b* on the upper end of the positioning pin 48*e*. Thereafter, the rear end portion of the extended portion 80*b* is lowered so that the extended portion 80*b* becomes horizontal, thereby inserting the positioning pin 48*e* into the positioning hole 80*f* to position the installation plate 80 with respect to the lower case 48 (see FIG. 13).

In the condition where the guiding portion 80*g* is inserted through the guided portion 51*b* as shown in FIG. 9, the magnet 51*g* provided in the guided portion 51*b* is relatively attracted to the guiding portion 80*g* of the installation plate 80 formed of a magnetic material, so that the upper surface of the lower engaging portion 51*f* abuts against the lower surface of the guiding portion 80*g*. Accordingly, the optical pickup 51 is moved in the longitudinal direction, i.e., in the radial direction of the disk 100 in the condition where the upper surface of the lower engaging portion 51*f* is kept in contact with the lower surface of the guiding portion 80*g*.

Finally, the mounting screws 80*h* are threadedly engaged with the tapped holes of the mounting bosses 48*c*, thereby completing the mounting of the installation plate 80 to the lower case 48.

In the disk drive 1 mentioned above, the installation plate 80 detachably mounted on the lower case 48 is integrally formed with the restricting portion 80*d* for preventing disconnection of the disk table 81 and the guiding portion 80*g* for guiding the optical pickup 51. Accordingly, it is unnecessary to provide any dedicated member for preventing disconnection of the disk table 81 and any dedicated member for guiding the optical pickup 51, so that the structure of the disk drive 1 can be simplified and the number of parts can be reduced.

Furthermore, any steps for mounting the above dedicated members to the lower case 48 are not required. As a result, the number of man-hours for assembly of the components of the disk drive 1 can be reduced to thereby improve the workability in assembling and the maintainability.

Further, the installation plate 80 is formed so as to have a substantially U-shaped configuration, and the restricting portion 80d is formed with the arcuate portion 80e. Accordingly, the installation plate 80 can be slid to be mounted or demounted with respect to the lower case 48. Thus, the installation plate 80 can be easily mounted or demounted with respect to the lower case 48.

Further, the arcuate portion 80e of the restricting portion 80d has a central angle of 180° or more. Accordingly, a force of restricting the movement of the disk table 81 in its disconnecting direction can be dispersed to thereby improve the restricting force by the restricting portion 80d.

In addition, the installation plate 80 is formed of a magnetic material, and the magnet 51g is provided in the guided portion 51b of the optical pickup 51. Accordingly, the magnet 51g is relatively attracted to the guiding portion 80g of the installation plate 80, so that the optical pickup 51 can be moved in the radial direction of the disk 100 in the stable condition where no oscillation in the focusing direction occurs. As a result, it is possible to prevent the occurrence of recording errors and reproducing errors of an information signal.

This structure that the magnet 51g is provided in the guided portion 51b so as to be relatively attracted to the guiding portion 80g of the installation plate 80 is effective particularly in the case that the optical pickup 51 is light in weight and therefore easily oscillates in the focusing direction or in the case that the optical pickup 51 is arranged in the vertical condition as in a so-called vertical disk drive.

While the magnet 51g is provided on the lower engaging portion 51f of the guided portion 51b in this preferred embodiment, the magnet 51g may be provided on the upper engaging portion 51e of the guided portion 51b. In this case, the optical pickup 51 is moved in the radial direction of the disk 100 in the condition where the lower surface of the upper engaging portion 51e is kept in contact with the upper surface of the guiding portion 80g.

The operation of the disk drive 1 will now be described (see FIGS. 21 to 37).

When the power button of the operation buttons 9 is operated to power on the disk drive 1, the operation of the disk drive 1 can be started. First, an initial condition of each component before starting the operation will be described.

As shown in FIG. 21, the base unit 20 in the initial condition is accommodated in the unit accommodating portion 19a defined between the guide members 19 inside the inner cover 33. In the condition where the base unit 20 is accommodated in the unit accommodating portion 19a, the supported shafts 68a and 68b of the support arm 66 are engaged with the upper end portions of the guide holes 57a of the guide member 55 and are also engaged with the horizontal portions 63a of the front cam holes 63 of the cam slider 60 and the horizontal portions 64a of the rear cam holes 64 of the cam slider 60. Accordingly, the cam slider 60 is kept at the rearward moving end in its movable range, and the support arm 66 is kept at the upward moving end in its movable range. At this time, the second detection switch 58 provided on the guide member 55 is operated by the rear end surface of the upper plate portion 61 of the cam slider 60 (see FIG. 22), thereby detecting that the cam slider 60 is kept at the rearward moving end in its movable range.

As mentioned above, the horizontal portions 63a of the front cam holes 63 are slightly higher in level than the horizontal portions 64a of the rear cam holes 64. Accordingly, in the condition where the support arm 66 is kept at the upward moving end in its movable range, the support arm 66 is slightly inclined upward to the front side (see FIG. 22).

The cover 2 in the initial condition is in a closed position such that the recording medium mounting portion 10 and the inner cover 33 are enclosed by the cover 2 (see FIG. 21).

Figure 23:
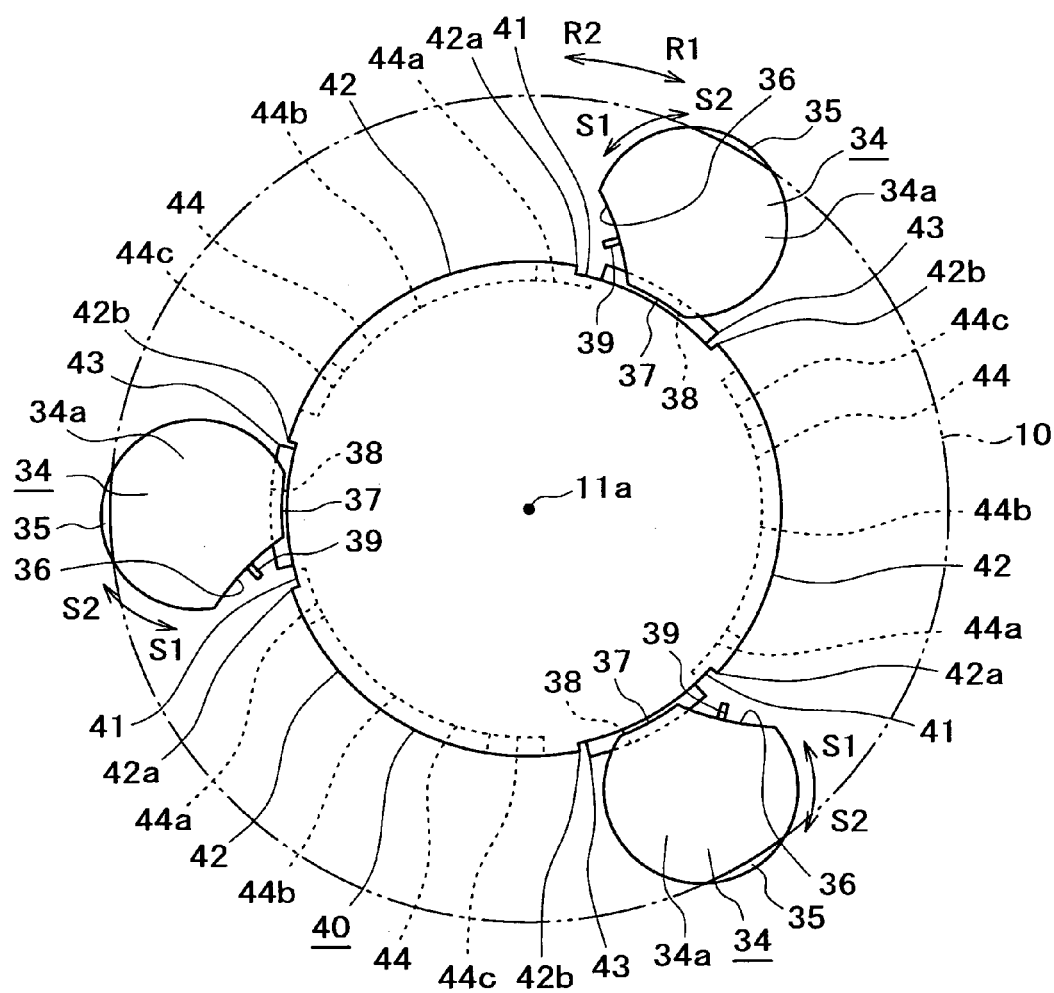
FIG. 23 is a plan view showing an initial condition before performing a centering operation.

As shown in FIG. 23, the projections 43 of the cam member 40 in the initial condition are located at positions corresponding to the locating recesses 8a of the support cylinder portions 8 of the base panel 5 and are engaged with the second Geneva surfaces 38 of the rotary members 34. Accordingly, the rotation of the rotary members 34 is restricted. The rotary members 34 are kept at their downward moving ends and are not projected upward from the disk mounting surface 11 of the base panel 5 as shown in FIG. 24.

The slide pins 39 of the rotary members 34 are not inserted in the cam grooves 44 of the cam member 40 (see FIG. 24).

As mentioned above, the rotary members 34 are restricted in rotation, and the disk centering portions 35 are located at their outermost positions (see FIG. 23). Accordingly, the disk centering portions 35 are located just outside of the disk mounting surface 11.

In the disk drive 1, the cover 2 is detachably mounted on the base panel 5, and the operation in the condition where the cover 2 has been removed from the base panel 5 is different from the operation in the condition where the cover 2 is mounted on the base panel 5. There will now be described the operation in the condition where the cover 2 is mounted on the base panel 5.

Figure 25:
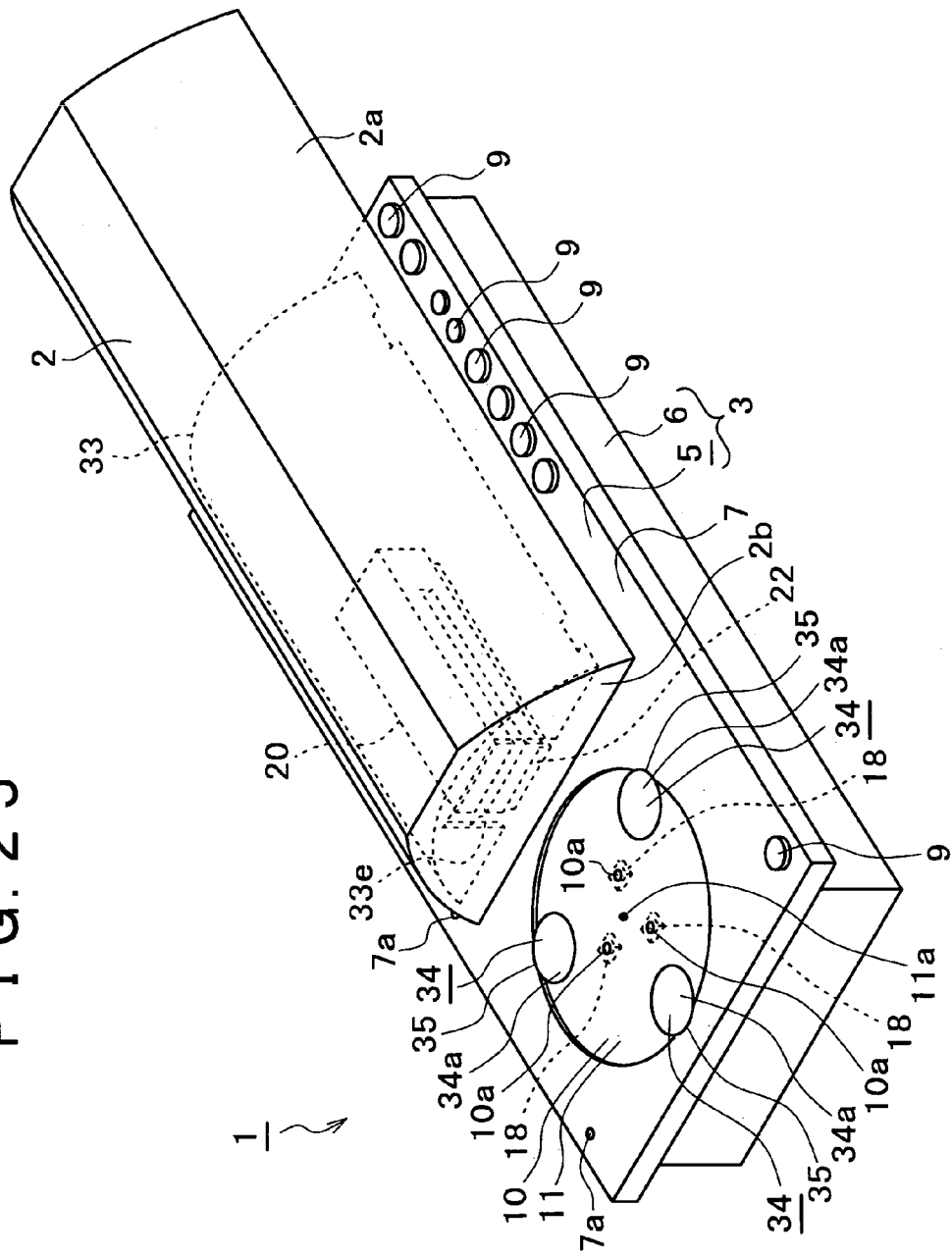
FIG. 25 is a perspective view showing a condition where the cover has been moved to an open position.
Figure 26:
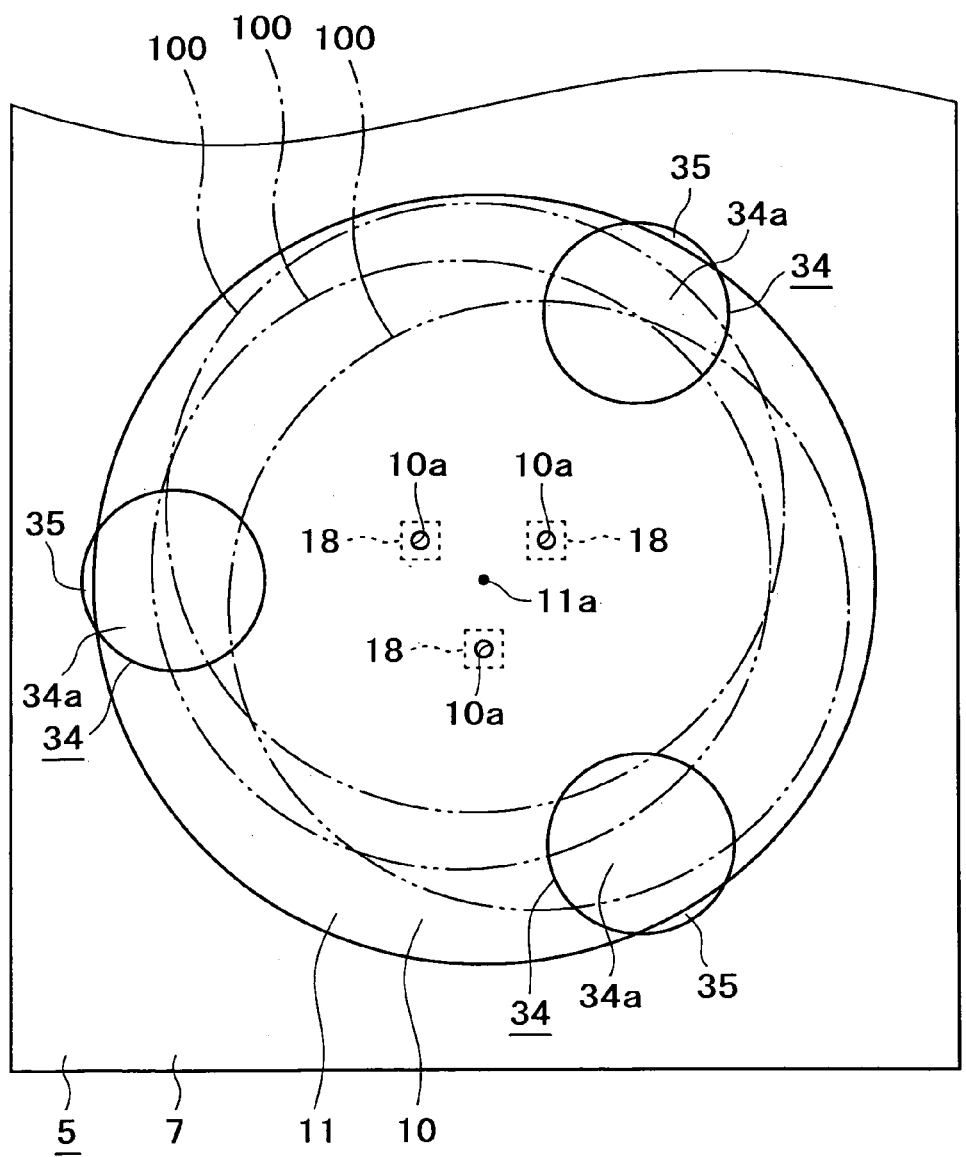
FIG. 26 is a schematic plan view showing mountable positions of the recording medium on a disk mounting surface.

When the open button is operated in the condition where the power button has already been operated to power on the disk drive 1, the cover 2 is moved by the cover driving portion 28 to an open position where the cover 2 is opened to expose the recording medium mounting portion 10 (see FIG. 25).

In the condition where the cover 2 has been moved to the open position, the disk 100 is mounted on the disk mounting surface 11 at an arbitrary position (see FIG. 26), and the close button is next operated.

As will be hereinafter described, the disk centering portions 35 of the rotary members 34 are moved toward a centering position to come into contact with the outer circumference of the disk 100 mounted on the disk mounting surface 11, thereby centering the disk 100. Accordingly, the disk 100 can be mounted at an arbitrary position on the disk mounting surface 11, so that the user can easily handle the disk 100.

When the disk 100 is mounted on the disk mounting surface 11, the presence of the disk 100 is detected by the sensors 18.

Figure 27:
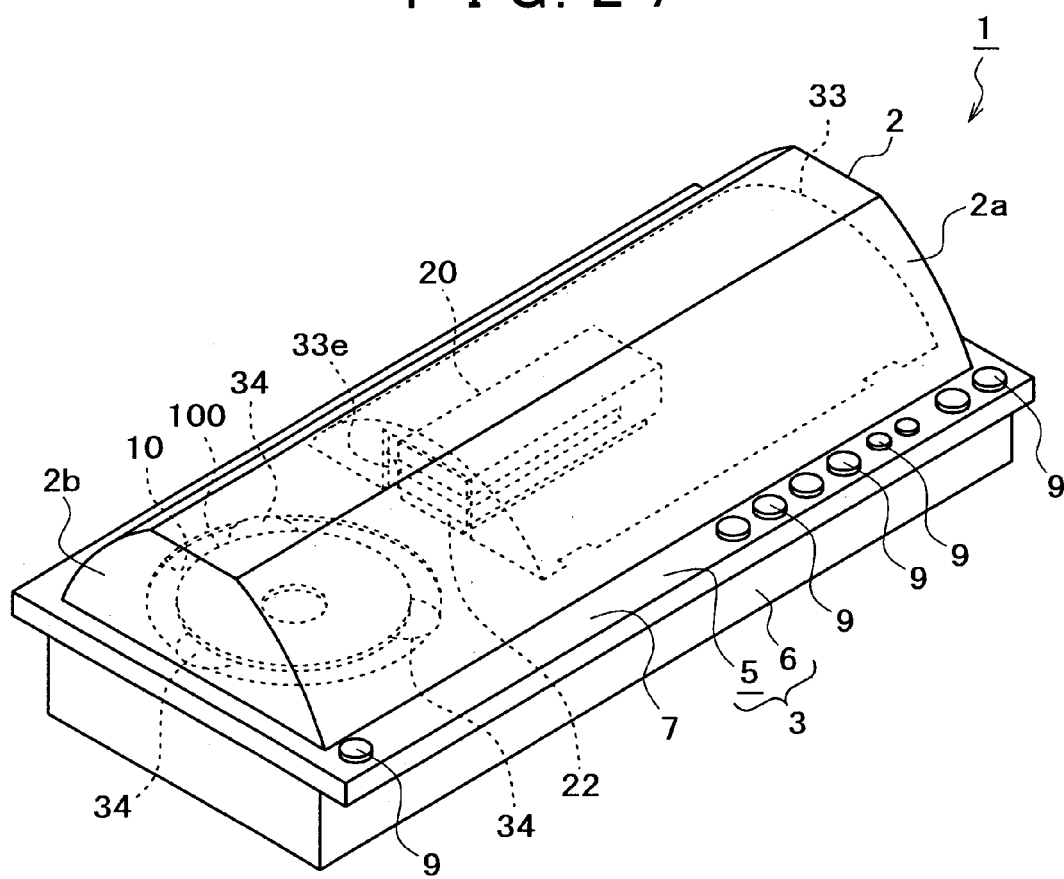
FIG. 27 is a perspective view showing a condition where the cover has been moved to a closed position with the recording medium being mounted on the disk mounting surface.

When the close button is operated, the cover 2 is moved to the closed position by the cover driving portion 28 to enclose the recording medium mounting portion 10 (see FIG. 27). The recording medium mounting portion 10 has a shallow dishlike shape as mentioned above, so that the disk 100 mounted on the disk mounting surface 11 does not project upward from the upper surface of the base panel 5. Accordingly, when the cover 2 is moved toward the closed position, the cover 2 does not come into contact with the disk 100 mounted on the disk mounting surface 11.

When the play button is next operated, the operating motor is started to rotate the cam member 40, thereby starting a centering operation for the disk 100 by the rotary members 34. In this manner, the centering operation is started when the play button is operated after operating the close button. Alternatively, the play button may be operated in the condition where the cover 2 is open, thereby continuously performing the movement of the cover 2 from the open position to the closed position and the centering operation by the rotary members 34.

When the centering operation is started, the cam member 40 is rotated in a direction of arrow R1 shown in FIG. 23.

When the cam member 40 is rotated in the direction R1 shown in FIG. 23, the projections 43 slide on the second Geneva surfaces 38 of the rotary members 34, and the rotary members 34 are not rotated until the first depressing portions 42a of the cam member 40 come into contact with the rotary members 34.

Figure 28:
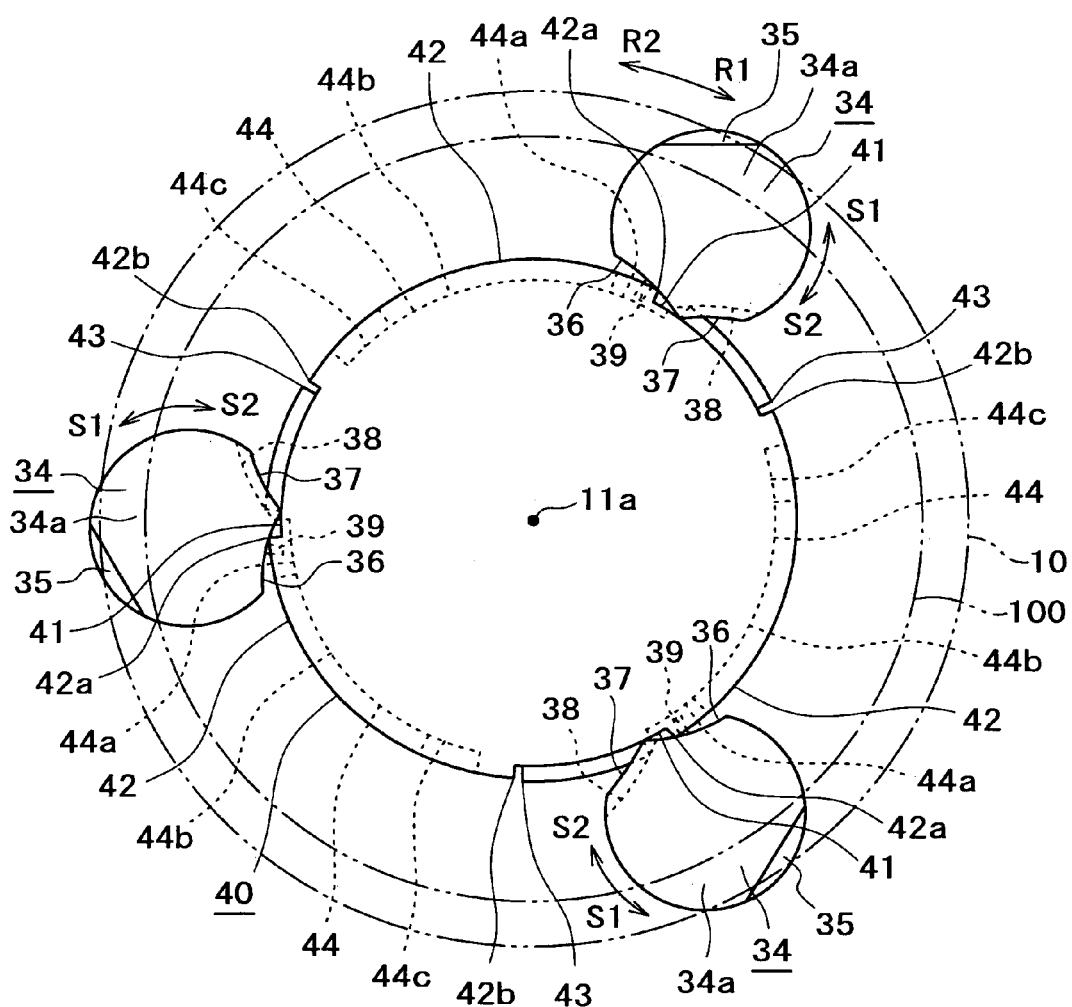
FIG. 28 is a plan view showing a condition where the centering operation has just been started.
Figure 29:
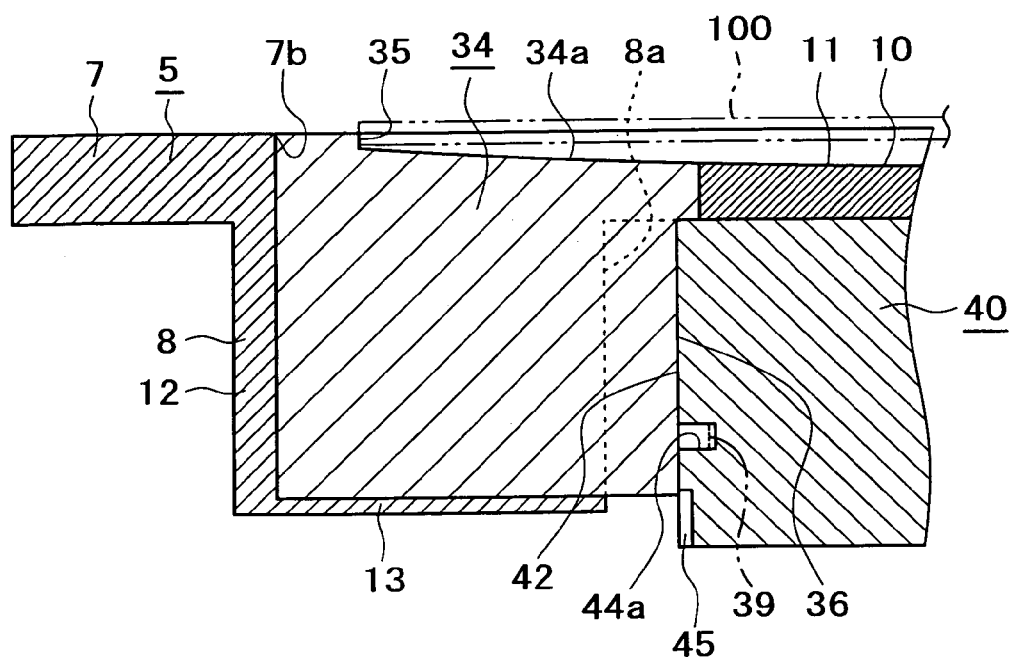
FIG. 29 is an enlarged sectional view showing a condition where the centering operation is started and slide pins of disk centering members are inserted into lower horizontal portions of cam grooves of the cam member.

When the cam member 40 is further rotated in the direction R1, the first Geneva surfaces 36 of the rotary members 34 are depressed by the first depressing portions 42a of the cam member 40 (see FIG. 28), so that the rotary members 34 are rotated in a direction of arrow S1 shown in FIG. 28. When the rotary members 34 are rotated in the direction S1, the slide pins 39 of the rotary members 34 are inserted into the lower horizontal portions 44a of the cam grooves 44 of the cam member 40 (see FIG. 29).

The rotation of the rotary members 34 in the direction S1 makes the disk centering portions 35 displace toward the centering position for centering the disk 100. That is, the outer circumference of the disk 100 is urged to be displaced by the disk centering portions 35 so that the center of the disk 100 comes into coincidence with the reference point 11a (see FIG. 28).

Figure 30:
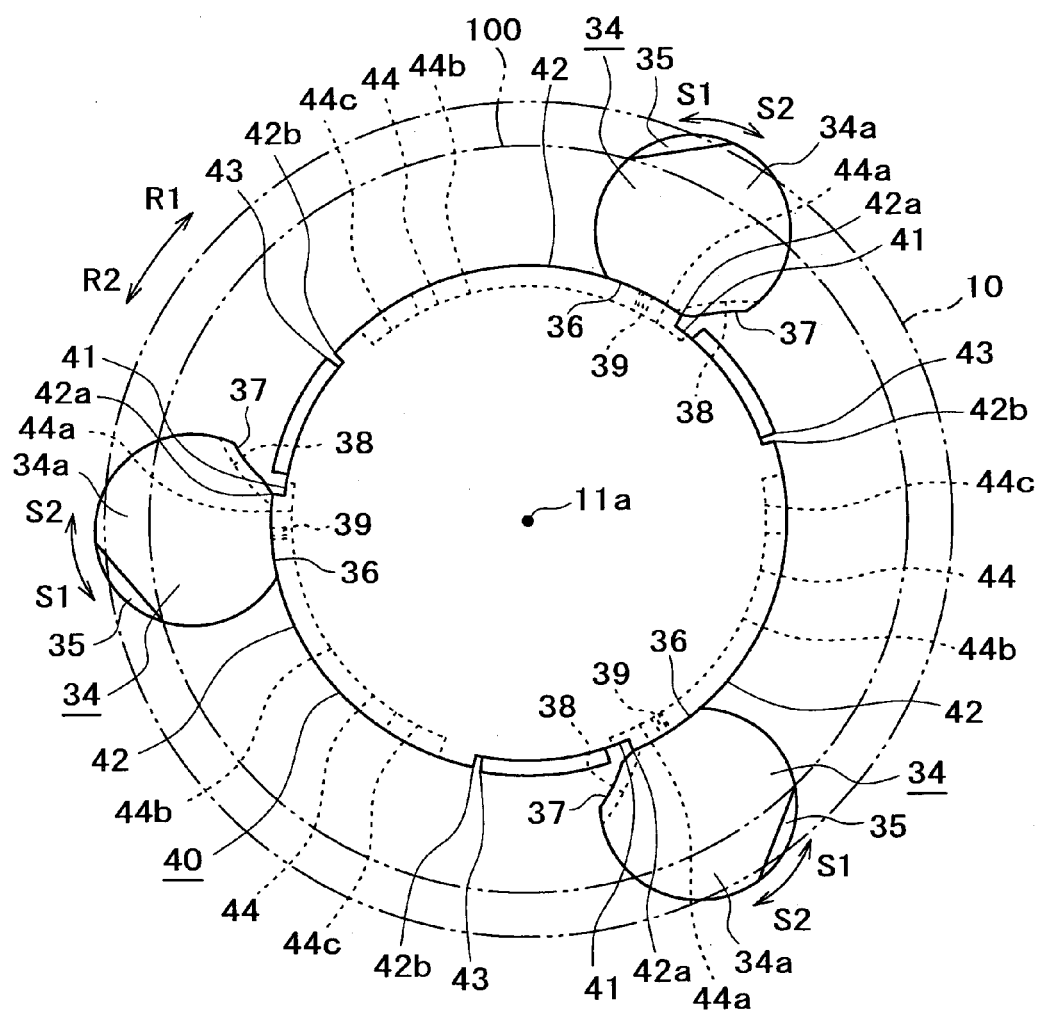
FIG. 30 is a plan view showing a condition where the centering of the recording medium has been completed.

When the center of the disk 100 comes into coincidence with the reference point 11a, the centering of the disk 100 is completed (see FIG. 30).

When the cam member 40 is further rotated in the direction R1, the slide pins 39 of the rotary members 34 are relatively moved from the lower horizontal portions 44a toward the inclined portions 44b of the cam grooves 44 (see FIG. 31). During the relative movement of the slide pins 39 in the inclined portions 44b of the cam grooves 44, the rotary members 34 are upward moved to project upward from the disk mounting surface 11 and accordingly lift the disk 100. At this time, the rotary members 34 are not rotated because the first Geneva surfaces 36 of the rotary members 34 slide on the outer cylindrical surfaces 42 of the cam member 40.

Figure 33:
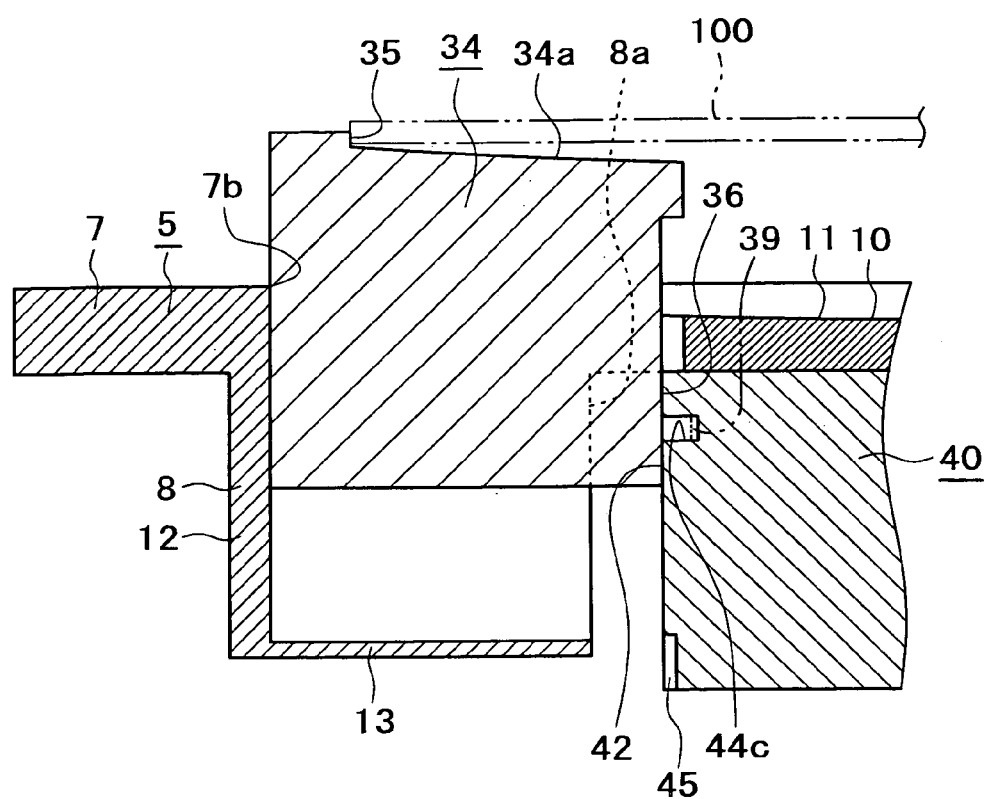
FIG. 33 is an enlarged sectional view showing a condition where the slide pins are inserted into upper horizontal portions of the cam grooves to lift the recording medium to a chucking position.
Figure 34:
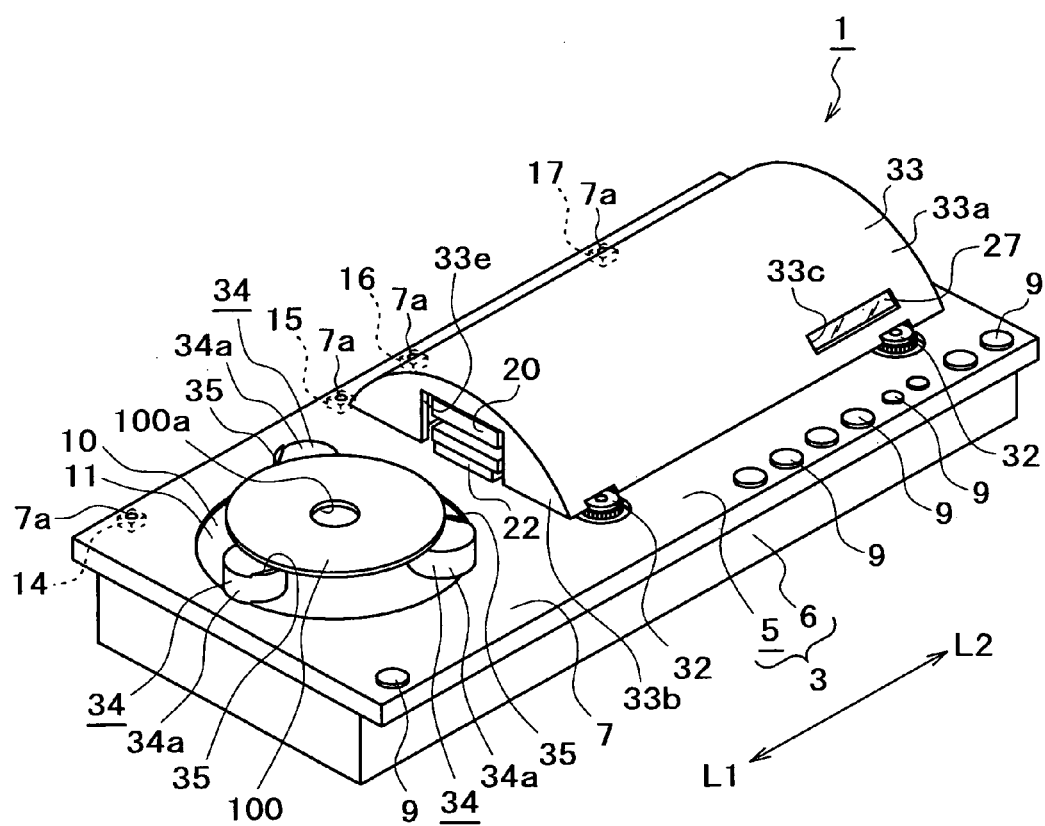
FIG. 34 is a perspective view showing a condition where the centering of the recording medium has been completed with the cover removed.

When the cam member 40 is further rotated in the direction R1 and the slide pins 39 of the rotary members 34 are relatively moved from the inclined portions 44b to the upper horizontal portions 44c of the cam grooves 44, the rotary members 34 are moved to their upper moving ends, thereby lifting the disk 100 to the centering position (see FIGS. 33 and 34). When the slide pins 39 of the rotary members 34 are relatively moved to the upper horizontal portions 44c, the operation of the operating motor is stopped to stop the rotation of the cam member 40.

Subsequently, the base unit 20, the control board 21, and the mounting base 22 are moved together by the unit driving portion 23 in a direction (shown by arrow L1 in FIG. 34) toward the disk 100 lifted by the rotary members 34.

Figure 35:
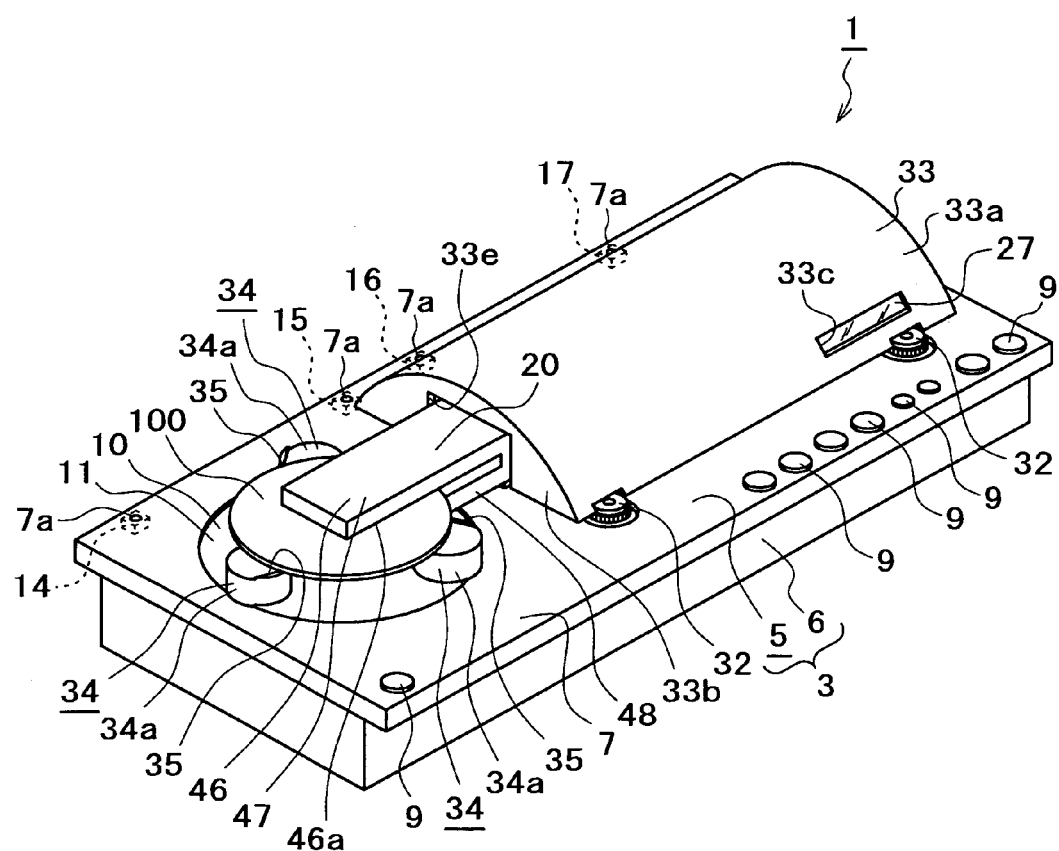
FIG. 35 is a perspective view showing a condition where the base unit has been drawn from a unit accommodating portion after completion of the centering of the recording medium with the cover removed.

When the disk table 81 and the chucking pulley 71 come to a central portion of the disk 100 by the movement of the base unit 20, the movement of the base unit 20 in the direction L1 is stopped (see FIG. 35). At this time, the disk 100 is kept lifted from the disk mounting surface 11 by the rotary members 34, so that the disk 100 is relatively inserted between the chucking pulley 71 and the disk table 81.

As mentioned above, the support arm 66 is inclined slightly upward to the front side during the movement of the base unit 20 in the direction L1. Accordingly, the space between the chucking pulley 71 and the disk table 81 is made wider, so that even when the support arm 66 is slightly deflected by its own weight or the like, the chucking pulley 71 does not come into contact with the disk 100. Accordingly, the disk 100 can be relatively smoothly inserted between the chucking pulley 71 and the disk table 81, thereby improving the reliability of operation.

Figure 32:
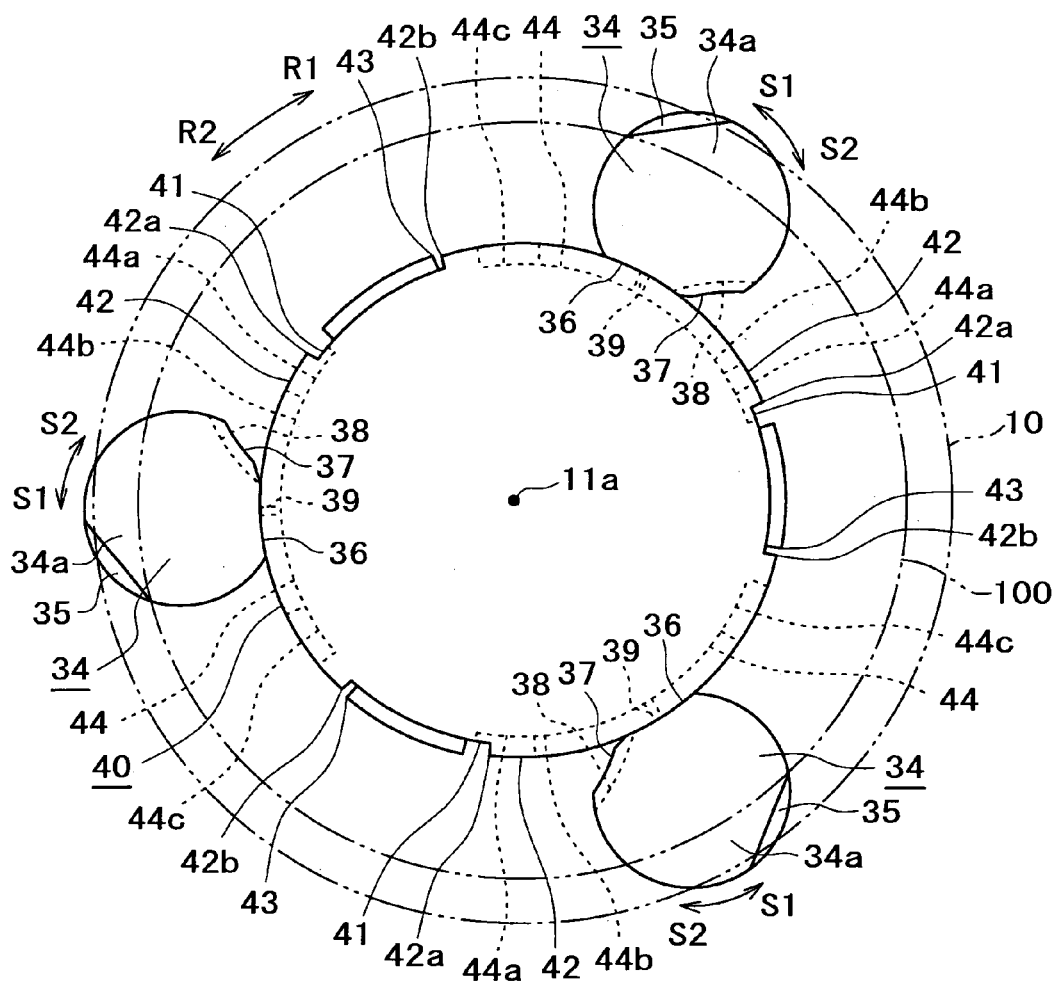
FIG. 32 is a plan view showing a condition where rotation of the disk centering members is restricted when the recording medium is lifted by the disk centering members.

When the movement of the base unit 20 in the direction L1 is stopped, the operating motor is reversely operated to rotate the cam member 40 in a direction of arrow R2 shown in FIG. 32. As a result, the slide pins 39 of the rotary members 34 are relatively moved from the upper horizontal portions 44c to the inclined portions 44b of the cam grooves 44, so that the rotary members 34 are rotated to be lowered to the initial position. The cam member 40 is also returned to the initial position when the operating motor is stopped.

When the rotary members 34 are lowered, the disk 100 is also lowered together with the rotary members 34, and the centering projection 83 of the disk table 81 is inserted into the center hole 100a of the disk 100 until the inner circumference of the disk 100 comes into contact with the centering conical surface 83c. Accordingly, the rotary members 34 are separated downward from the disk 100.

When the rotary members 34 are separated downward from the disk 100 and returned to their initial positions, the lifting motor 77 of the drive unit 76 mounted on the guide member 55 is operated. When the lifting motor 77 is operated, the rack member 65 meshing with the drive gear 75 is fed frontward to thereby frontward slide the cam slider 60.

Figure 36:
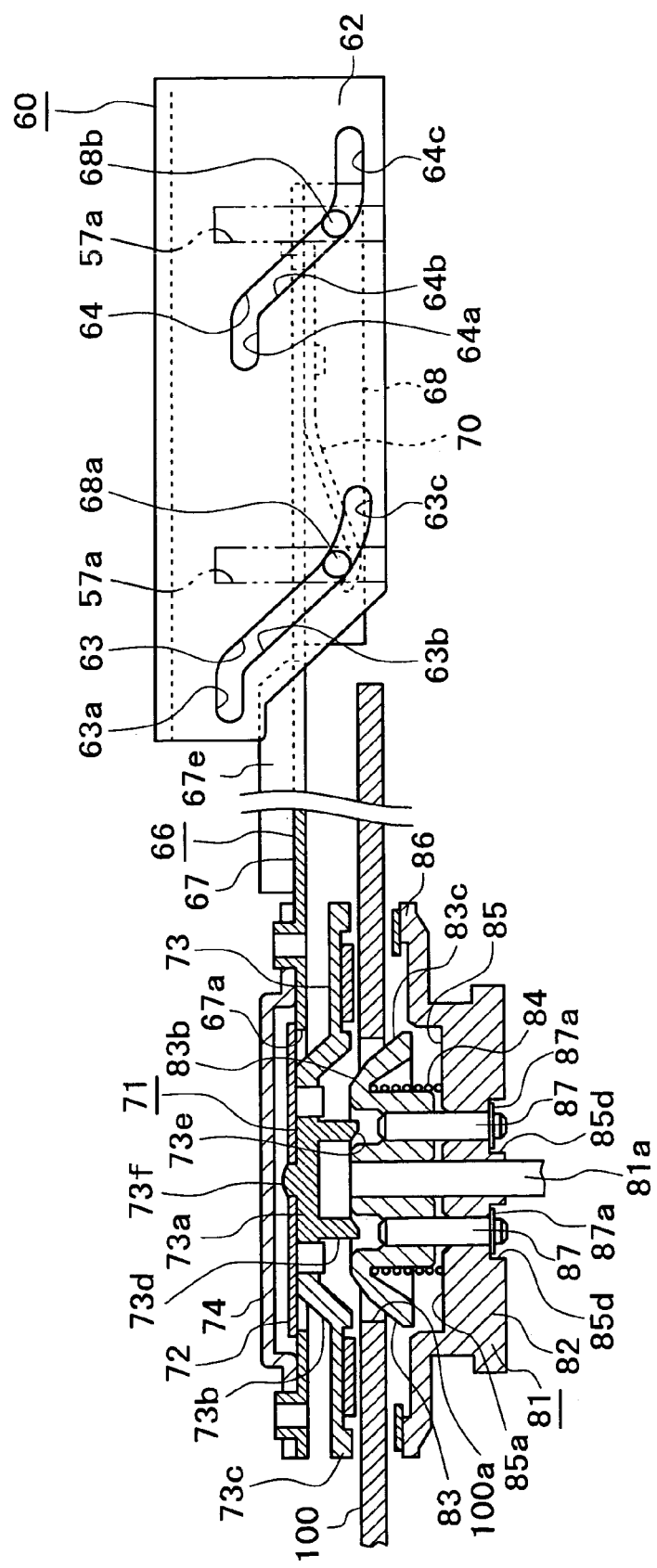
FIG. 36 is a partially sectional, side view showing a condition where a chucking operation is being performed.

When the cam slider 60 is slid frontward, the supported shafts 68a and 68b of the support arm 66 are relatively moved in the front cam holes 63 and the rear cam holes 64 of the cam slider 60 and in the guide holes 57a of the guide member 55. As shown in FIG. 36, the supported shafts 68a and 68b are moved from the horizontal portions 63a in the inclined portions 63b of the front cam holes 63 and from the horizontal portions 64a in the inclined portions 64b of the rear cam holes 64. Simultaneously, the supported shafts 68a and 68b are moved downward in the guide holes 57a. Accordingly, the support arm 66 is lowered as being guided by the guide holes 57a, and the chucking pulley 71 supported to the support arm 66 is moved toward the disk 100.

Figure 37:
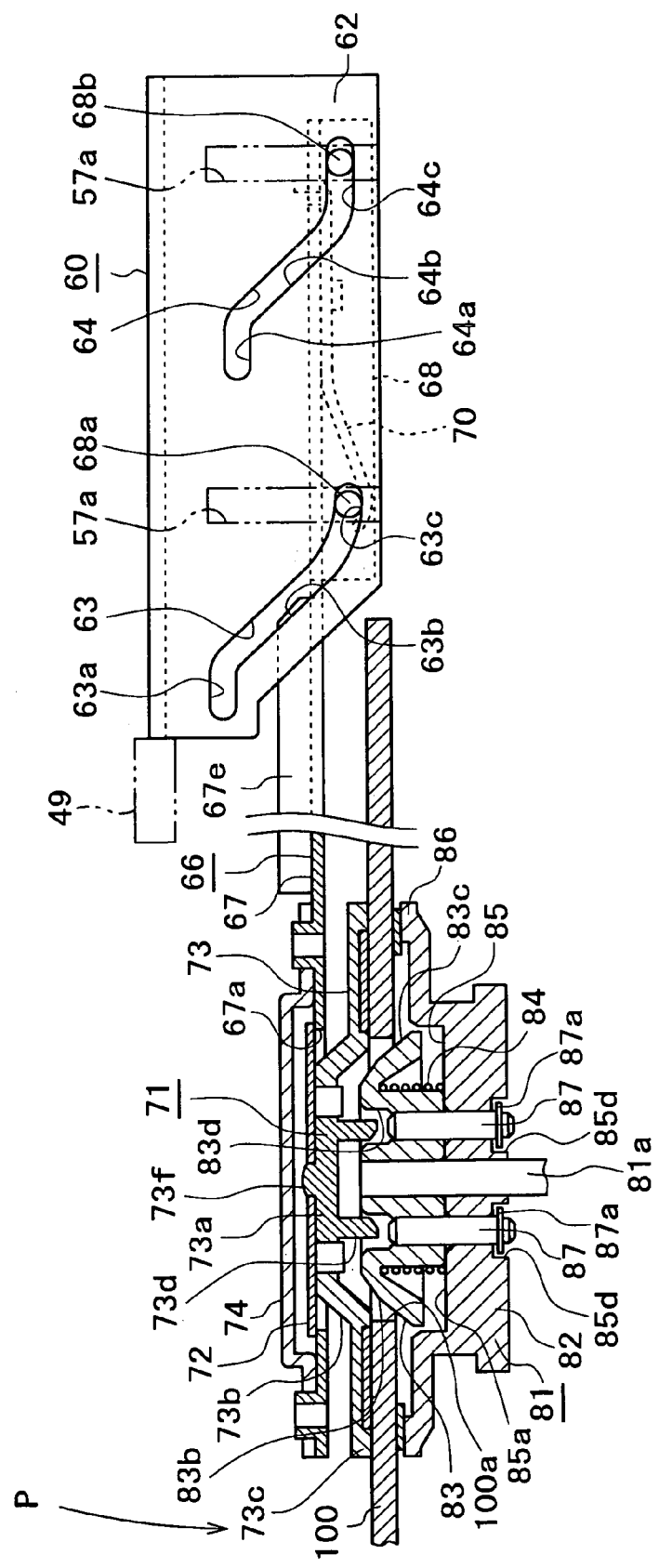
FIG. 37 is a partially sectional, side view showing a condition where the chucking operation has been completed.
Figure 38:
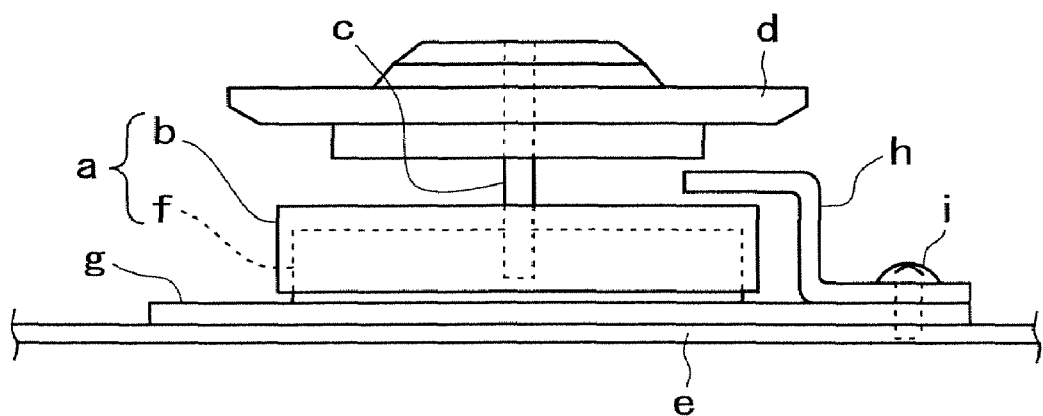
FIG. 38 is an enlarged side view showing a disconnection preventing mechanism provided in a conventional disk drive.

When the cam slider 60 is further moved frontward as shown in FIG. 37, the supported shafts 68a and 68b are moved from the inclined portions 63b in the working portions 63c of the front cam holes 63 and from the inclined portions 64b in the working portions 64c of the rear cam holes 64. Simultaneously, the guide shafts 68a and 68b are further moved downward in the guide holes 57a. Accordingly, the support arm 66 is further moved downward to further lower the chucking pulley 71. As a result, the disk 100 is depressed downward by the depressing portion 73c, and the disk 100 and the centering projection 83 are lowered together against the biasing force of the biasing spring 84.

During this downward movement of the support arm 66, the front supported shafts 68a are moved in the inclined working portions 63c, and the rear supported shafts 68b are moved in the horizontal working portions 64c. Accordingly, the support arm 66 is swung about the rear supported shafts 68b as a pivot in a direction of arrow P shown in FIG. 37, that is, the chucking pulley 71 is pivotally moved slowly in the direction P toward the disk 100. By the pivotal movement of the support arm 66 about the rear supported shafts 68b, the chucking pulley 71 comes into pressure contact with the disk 100 depressed on the mounting portion 86 of the disk table 81, so that the inner circumferential portion of the disk 100 is held by the disk table 81 and the chucking pulley 71, thus chucking the disk 100. In this chucked condition of the disk 100, the pivot projection 73f of the chucking pulley 71 abuts against the lower surface of the cover plate 74. Accordingly, the chucking pulley 71 is held by the cover plate 74.

As mentioned above, the support arm 66 is pivotally moved slowly in chucking the disk 100. Accordingly, it is possible to improve a silencing performance in bringing the chucking pulley 71 into pressure contact with the disk 100, and it is also possible to prevent scratch, damage, and deformation of the disk 100 due to the contact of the chucking pulley 71.

Further, the working portions 63c of the front cam holes 63 are inclined. Accordingly, it is possible to reduce the drive force of the lifting motor 77 for moving the supported shafts 68a of the support arm 66 in the working portions 63c. As a result, a smooth operation of the disk drive 1 can be ensured.

When the disk 100 is chucked by the chucking pulley 71 and the disk table 81, the cam slider 60 is located at the front moving end in its movable range, and the first detection switch 49 mounted on the upper case 47 is operated by the front end of the upper plate portion 61 of the cam slider 60 (see FIG. 37). Accordingly, the first detection switch 49 detects that the cam slider 60 is located at the front moving end in its movable range, and the operation of the lifting motor 77 is stopped.

When the chucking of the disk 100 is completed, the spindle motor 50 is operated to rotate the disk table 81, the disk 100, and the chucking pulley 71 as a unit. Further, the optical pickup 51 is driven to reproduce the information signal recorded on the disk 100, for example. The chucking pulley 71 is rotated in the condition where the pivot projection 73f is in contact with the lower surface of the cover plate 74.

When the reproduction of the information signal from the disk 100 is ended, the lifting motor 77 is reversely operated to rearward move the cam slider 60, thereby lifting the support arm 66. Accordingly, the chucked condition of the disk 100 by the chucking pulley 71 and the disk table 81 is released. At this time, the disk 100 is placed on the disk table 81.

When the cam slider 60 is moved rearward to the rear moving end in its movable range, the second detection switch 58 is operated by the rear end of the upper plate portion 61 to detect that the cam slider 60 is located at the rear moving end in its movable range. Accordingly, the operation of the lifting motor 77 is stopped to restore the initial condition of the cam slider 60 and the support arm 66.

Subsequently, the operating motor is operated to rotate the cam member 40 in the direction R1. Accordingly, the slide pins 39 of the rotary members 34 are relatively moved from the inclined portions 44b to the upper horizontal portions 44c of the cam grooves 44, so that the upper surfaces 34a of the rotary members 34 come into contact with the lower surface of the disk 100 to lift the disk 100, and the disk centering portions 35 come into contact with the outer circumference of the disk 100. Accordingly, the disk 100 is lifted from the disk table 81. When the upper surfaces 34a of the rotary members 34 come into contact with the lower surface of the disk 100 to lift the disk 100, and the disk centering portions 35 come into contact with the outer circumference of the disk 100 as mentioned above, the operation of the operating motor is stopped to stop the rotation of the cam member 40.

When the disk 100 is lifted by the rotary members 34, the base unit 20, the control board 21, and the mounting base 22 are moved as a unit by the unit driving portion 23 in a direction of arrow L2 shown in FIG. 34, and the base unit 20 is accommodated into the unit accommodating portion 19a.

After the base unit 20 is moved rearward and accommodated into the unit accommodating portion 19a, the disk 100 is kept lifted by the rotary members 34. Accordingly, if the open button is operated to move the cover 2 to the open position, the user can easily pick up the disk 100 and remove the disk from the disk drive 1.

When the disk 100 is removed from the disk drive 1, the absence of the disk 100 in the disk drive 1 is detected by the sensors 18.

When the absence of the disk 100 in the disk drive 1 is detected by the sensors 18, the operating motor is operated to rotate the cam member 40 in the direction R2. As a result, the rotary members 34 are lowered to restore the initial condition.

While the disk 100 is removed from the disk drive 1 just after rearward moving the base unit 20 in this preferred embodiment, the rotary members 34 may be lowered to once mount the disk 100 on the disk mounting surface 11 just after rearward moving the base unit 20.

In this case, the user can easily remove the disk 100 from the disk drive 1 by lifting the rotary members 34 to lift the disk 100 and next stopping the rotary members 34 at a given vertical position to thereby define a given space between the disk 100 and the disk mounting surface 11 of the base panel 5.

While preferred embodiments of the invention have been described using specific terms, such description is for illustrative purposes only, and it is to be understood that changes and variations may be made without departing from the spirit or scope of the following claims.

What is claimed is:

1. A disk drive comprising:
a base;
a spindle motor mounted on said base;
a disk table fixed to a motor shaft of said spindle motor and adapted to be rotated about the axis of said motor shaft by said spindle motor;
an optical pickup supported movably in a radial direction of a disk-shaped recording medium mounted on said disk table;
an installation plate detachably mounted on said base;
a guided portion provided on said optical pickup and adapted to be guided during movement of said optical pickup in the radial direction of said disk-shaped recording medium; and
a restricted groove formed on an outer circumferential surface of said disk table so as to extend in a circumferential direction of said disk table;
said installation plate being integrally formed with a restricting portion inserted in said restricted groove of said disk table for restricting movement of said disk table in an axial direction of said motor shaft, and a guiding portion engaged with said guided portion of said optical pickup for guiding said optical pickup in the radial direction of said disk-shaped recording medium.

2. The disk drive according to claim 1, wherein said restricting portion comprises an opening edge of a recess opening in a direction perpendicular to a direction along the thickness of said installation plate;

at least a part of said opening edge being formed as an arcuate portion.

3. The disk drive according to claim 2, wherein said arcuate portion has a central angle of 180° or more.

4. The disk drive according to claim 1, wherein said installation plate is formed of a magnetic material; and said guided portion is provided with a magnet for generating an attractive force in the axial direction of said motor shaft to attract said guiding portion.

\* \* \* \* \*